(12) United States Patent
Machida

(10) Patent No.: US 10,877,240 B2
(45) Date of Patent: Dec. 29, 2020

(54) ZOOM OPTICAL SYSTEM, OPTICAL APPARATUS AND METHOD FOR MANUFACTURING THE ZOOM OPTICAL SYSTEM

(71) Applicant: Nikon Corporation, Tokyo (JP)

(72) Inventor: Kosuke Machida, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 191 days.

(21) Appl. No.: 15/777,910

(22) PCT Filed: Nov. 28, 2016

(86) PCT No.: PCT/JP2016/085190
§ 371 (c)(1),
(2) Date: Jul. 31, 2018

(87) PCT Pub. No.: WO2017/094660
PCT Pub. Date: Jun. 8, 2017

(65) Prior Publication Data
US 2018/0348476 A1    Dec. 6, 2018

(30) Foreign Application Priority Data

Nov. 30, 2015 (JP) .................................. 2015-234010

(51) Int. Cl.
*G02B 15/14* (2006.01)
*G02B 9/10* (2006.01)
(Continued)

(52) U.S. Cl.
CPC ............. *G02B 9/10* (2013.01); *G02B 15/142* (2019.08); *G02B 15/163* (2013.01); *G02B 15/20* (2013.01);
(Continued)

(58) Field of Classification Search
CPC ...... G02B 13/0045; G02B 13/18; G02B 9/60; G02B 9/62; G02B 5/005; G02B 9/34;
(Continued)

(56) References Cited

U.S. PATENT DOCUMENTS

2005/0219708 A1    10/2005  Shibayama et al.
2014/0009652 A1*    1/2014  Sugita ..................... G02B 7/102
                                                                  359/684

(Continued)

FOREIGN PATENT DOCUMENTS

CN    101866045 A    10/2010
CN    103969812 A     8/2014
(Continued)

OTHER PUBLICATIONS

Office Action dated Jan. 19, 2020, in Chinese Patent Application No. 201680069806.3.
(Continued)

*Primary Examiner* — Evelyn A Lester
(74) *Attorney, Agent, or Firm* — SGPatents PLLC

(57) ABSTRACT

A zoom optical system comprises, in order from an object: a first lens group (G1) having positive refractive power; a second lens group (G2) having negative refractive power; and a subsequent group (GR) including at least one lens group. Upon zooming, distances between the first lens group (G1) and the second lens group (G2) and between the second lens group (G2) and the subsequent group (GR) change. The subsequent group (GR) comprises a focusing group (Gfc) having negative refractive power for focusing. The first lens group (G1) comprises a 1-1st lens that has positive refractive power and is disposed closest to the object. A following conditional expression is satisfied:

$0.20 < f1/fR < 0.85$ where, (Continued)

f1 denotes a focal length of the first lens group, and fR denotes a focal length of a lens component, in the subsequent group, closest to an image surface.

16 Claims, 30 Drawing Sheets

(51) Int. Cl.
*G02B 15/20* (2006.01)
*G02B 15/163* (2006.01)
*G02B 5/00* (2006.01)
*G02B 9/34* (2006.01)
*G02B 15/17* (2006.01)
*G02B 9/60* (2006.01)
*G02B 9/62* (2006.01)
*G02B 9/12* (2006.01)
*G02B 13/00* (2006.01)
*G02B 13/18* (2006.01)
*G02B 9/64* (2006.01)

(52) U.S. Cl.
CPC ............... *G02B 5/005* (2013.01); *G02B 9/12* (2013.01); *G02B 9/34* (2013.01); *G02B 9/60* (2013.01); *G02B 9/62* (2013.01); *G02B 9/64* (2013.01); *G02B 13/009* (2013.01); *G02B 13/0045* (2013.01); *G02B 13/18* (2013.01); *G02B 15/14* (2013.01); *G02B 15/17* (2013.01)

(58) Field of Classification Search
CPC ...... G02B 13/009; G02B 9/64; G02B 15/163; G02B 15/17; G02B 15/20; G02B 15/14; G02B 9/12; G02B 9/10; G02B 15/142

USPC ............... 359/676, 683–690, 713–716, 740, 359/755–758, 763–766, 771–775, 784, 359/785

See application file for complete search history.

(56) References Cited

U.S. PATENT DOCUMENTS

| 2014/0146216 | A1 | 5/2014 | Okumura | |
|---|---|---|---|---|
| 2014/0211029 | A1 | 7/2014 | Okumura | |
| 2014/0347546 | A1* | 11/2014 | Obikane | G02B 15/14 |
| | | | | 359/694 |
| 2015/0309291 | A1* | 10/2015 | Ori | G02B 27/646 |
| | | | | 359/683 |

FOREIGN PATENT DOCUMENTS

| JP | H4-293007 A | 10/1992 |
|---|---|---|
| JP | 2011-209347 A | 10/2011 |
| JP | 2013-195627 A | 9/2013 |
| JP | 2015-138178 A | 7/2015 |

OTHER PUBLICATIONS

International Search Report from International Patent Application No. PCT/JP2016/085190, dated Feb. 21, 2017.
Office Action dated May 14, 2019, in Japanese Patent Application No. 2017-553837.
English translation of International Preliminary Report on Patentability from International Patent Application No. PCT/JP2016/085190, dated Jun. 14, 2018.
Office Action dated Jun. 8, 2020, in Chinese Patent Application No. 201680069806.3.

* cited by examiner

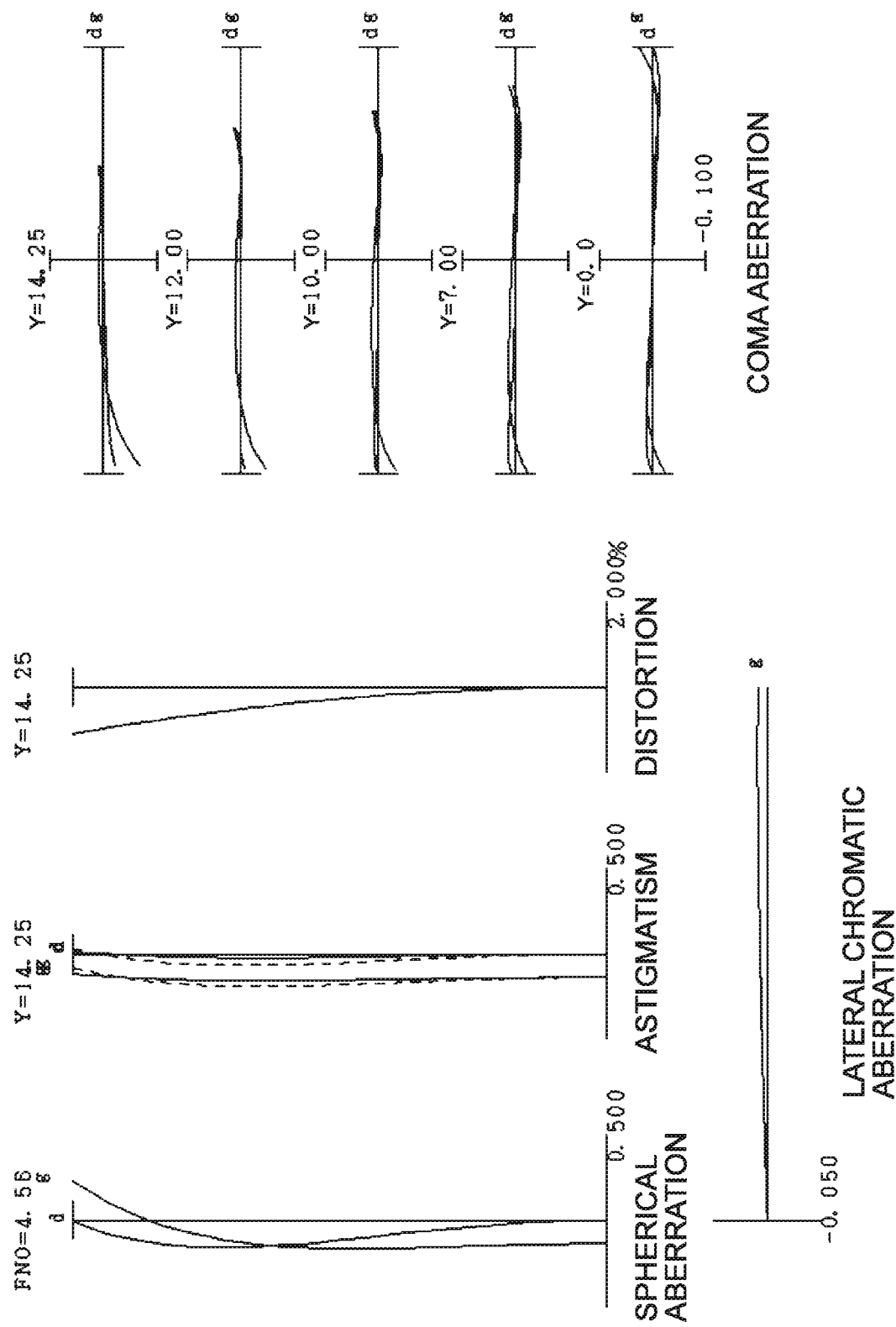

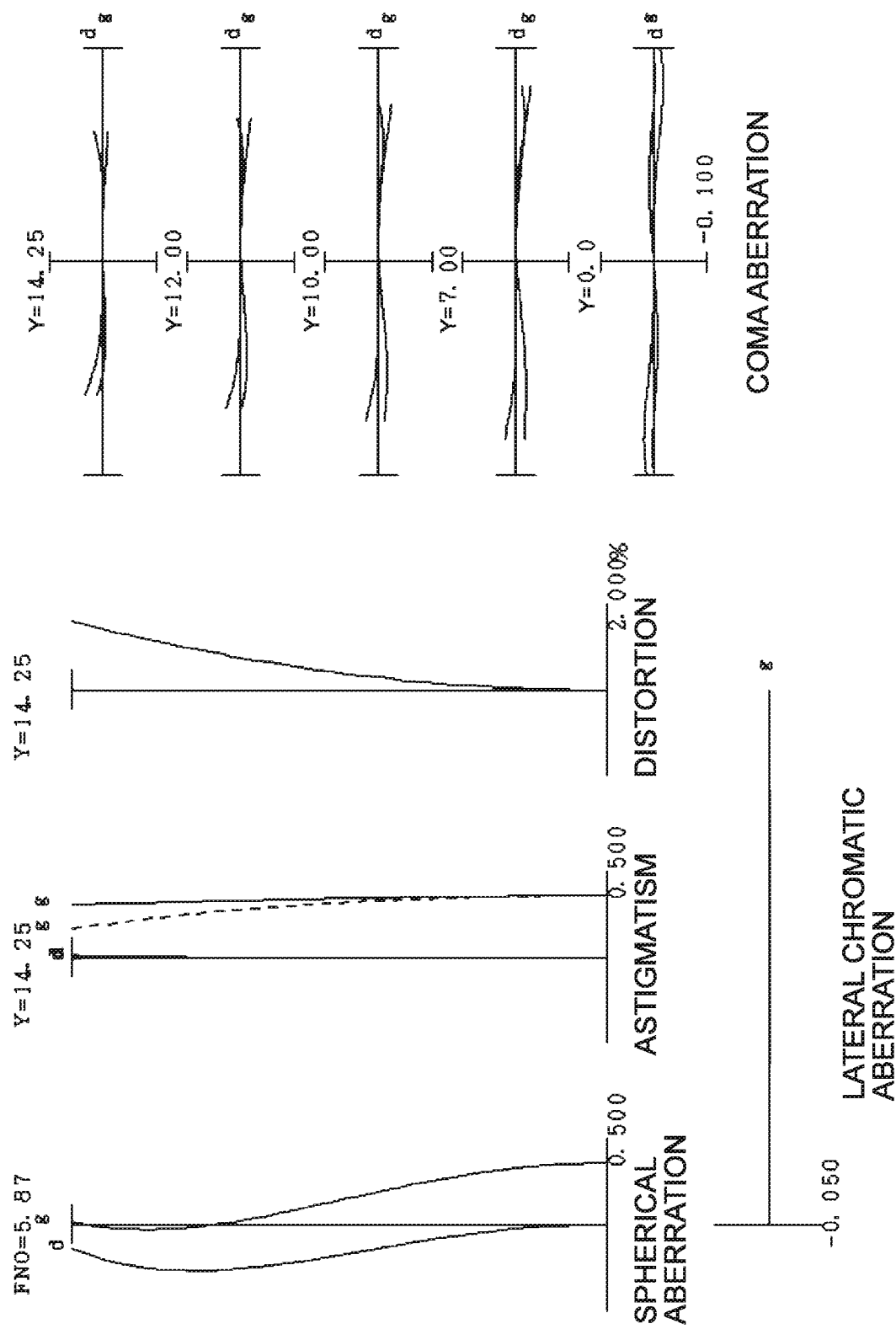

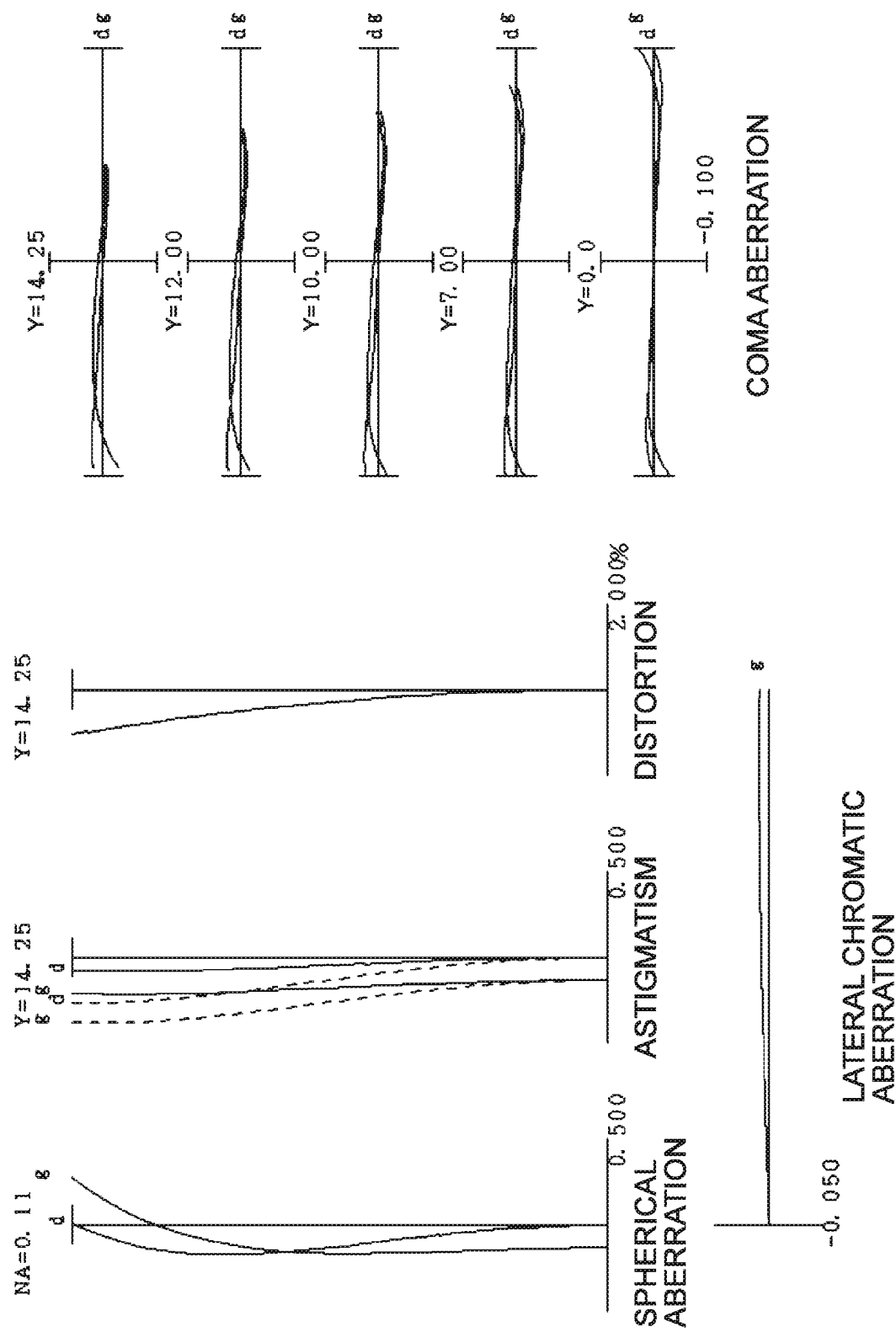

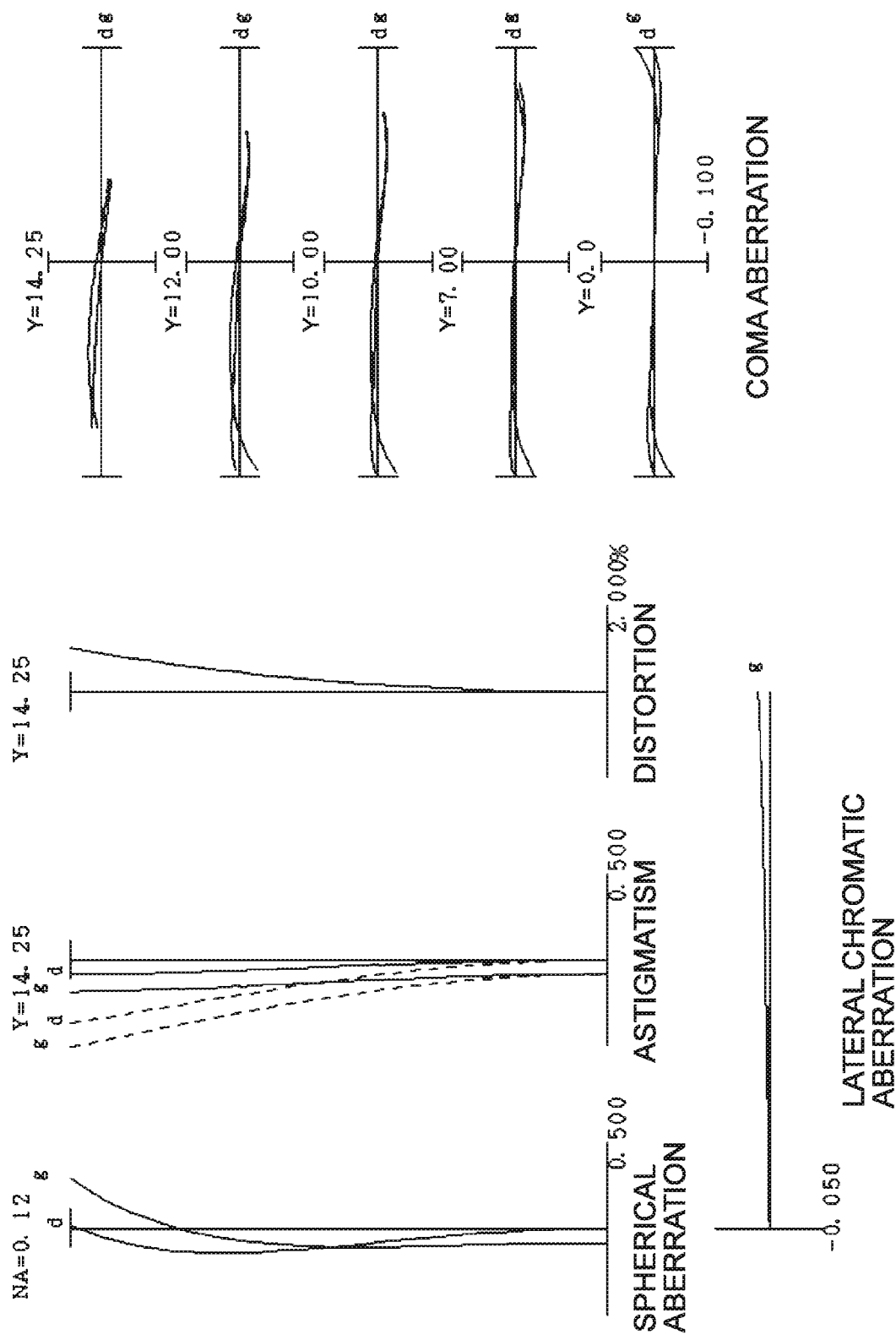

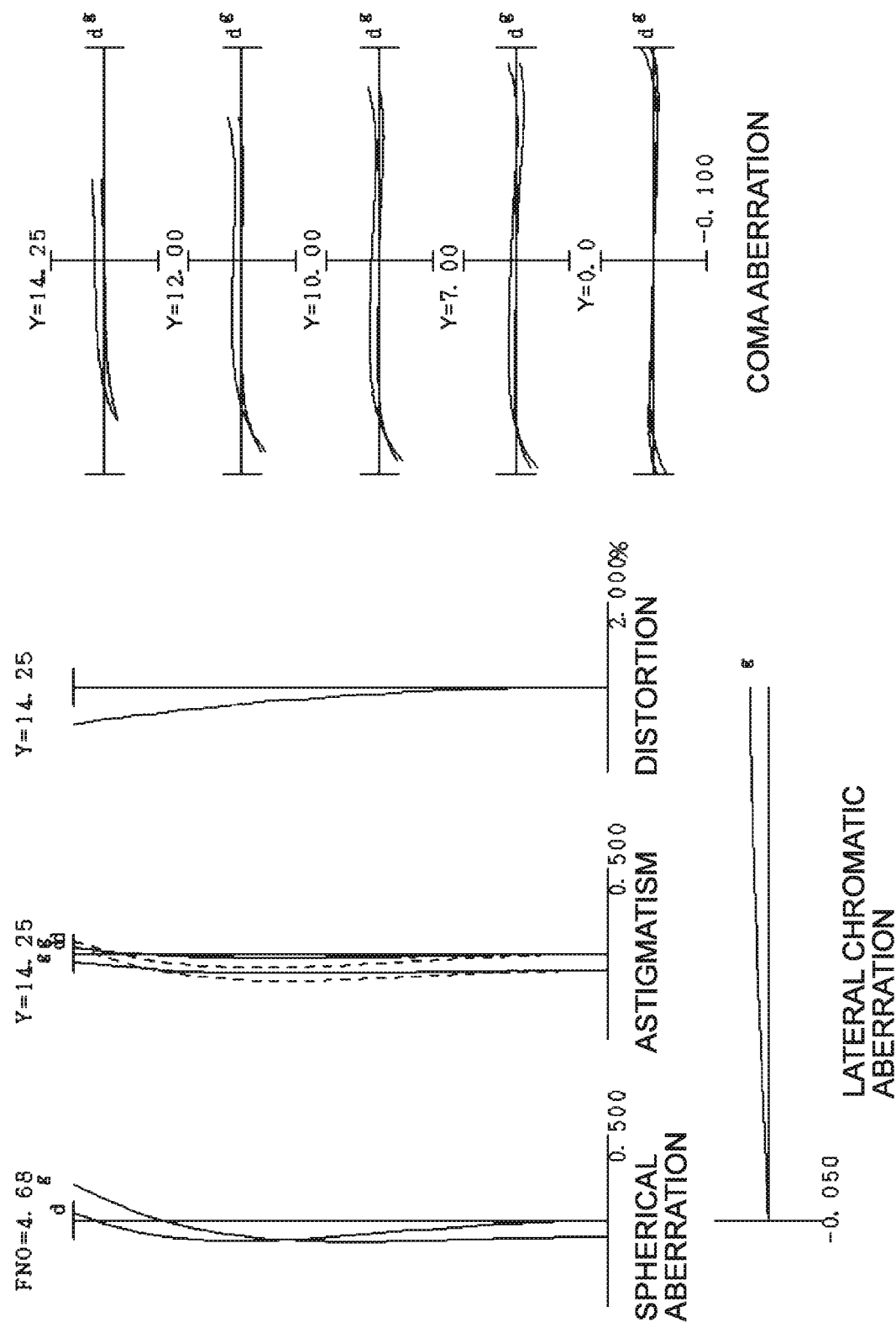

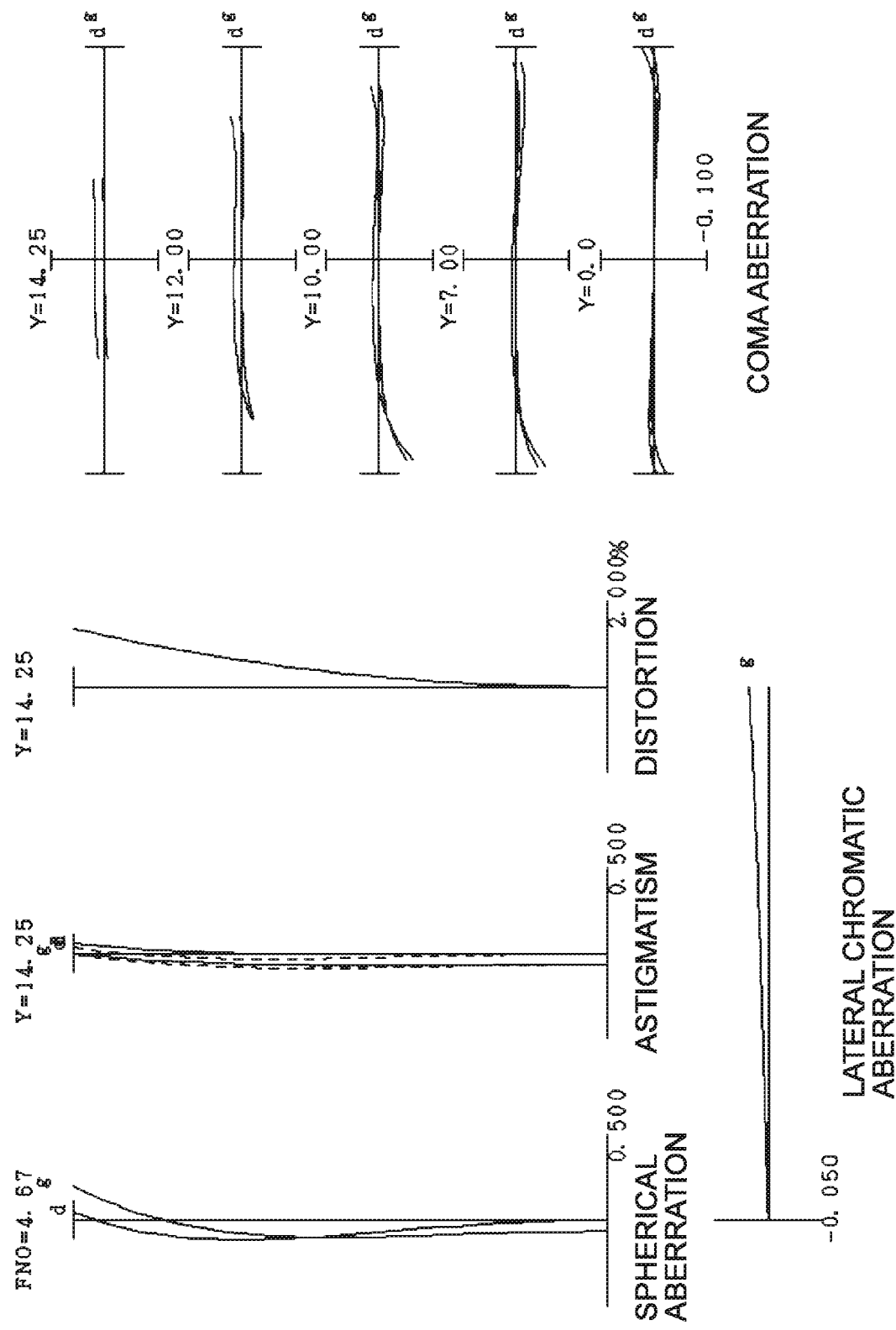

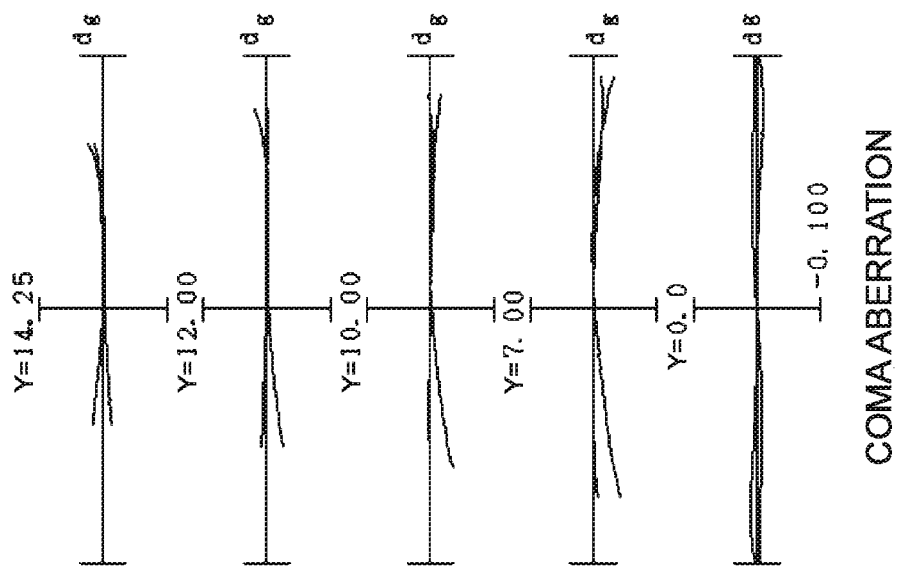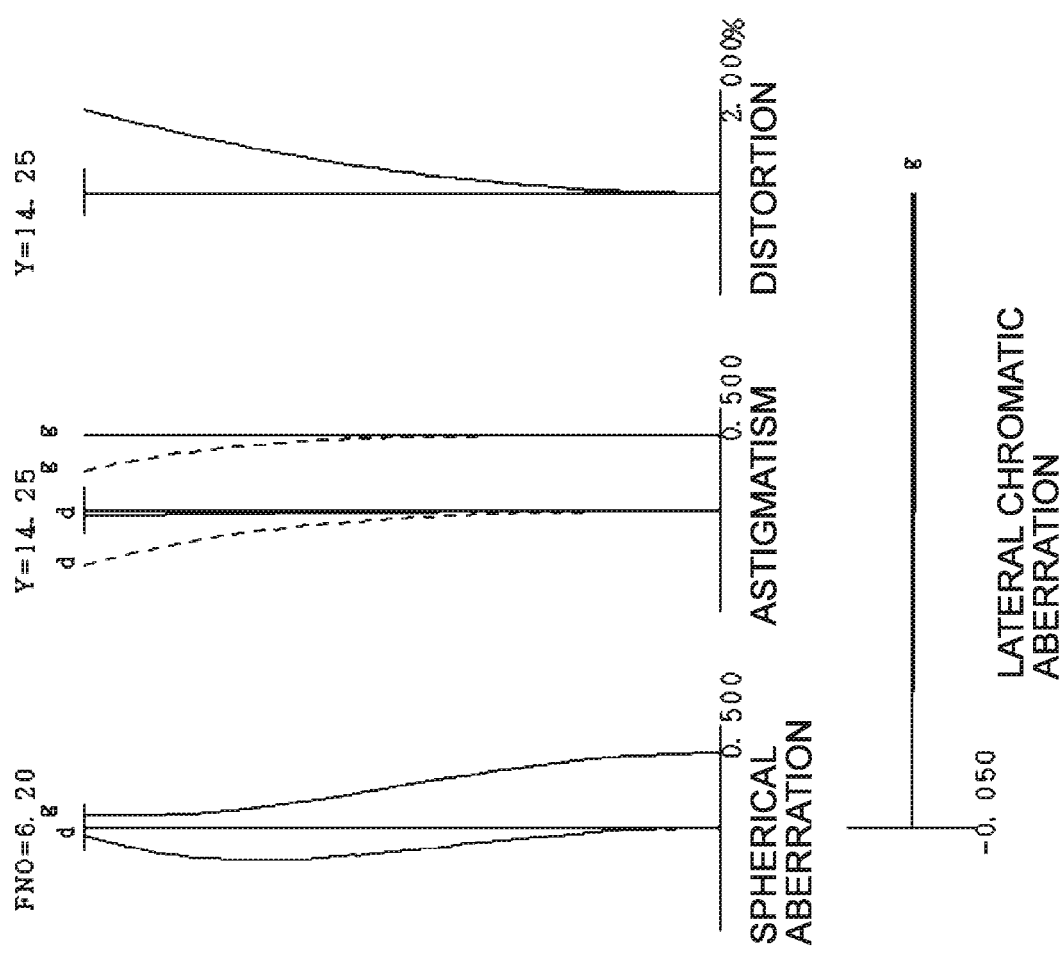
FIG.5C

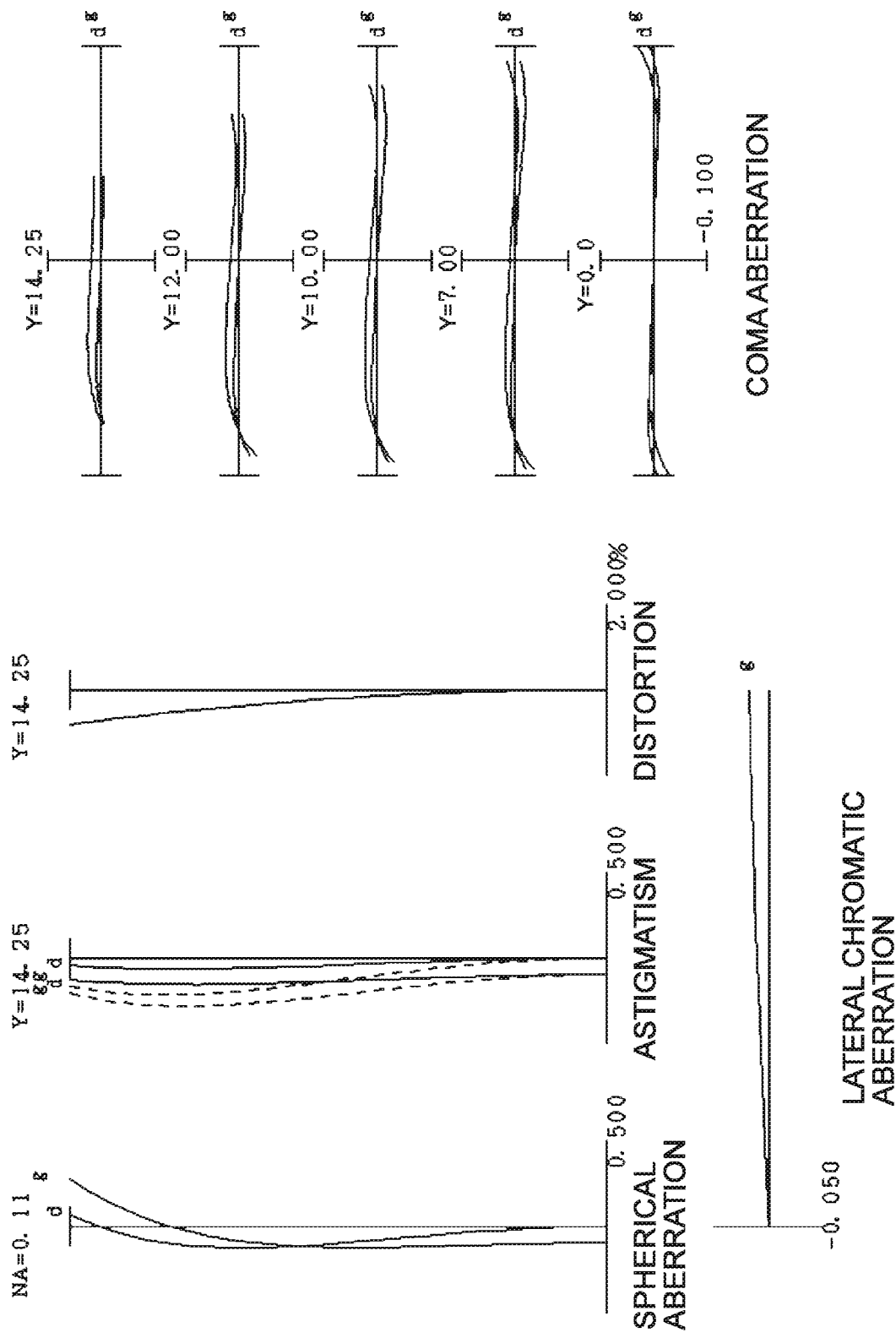

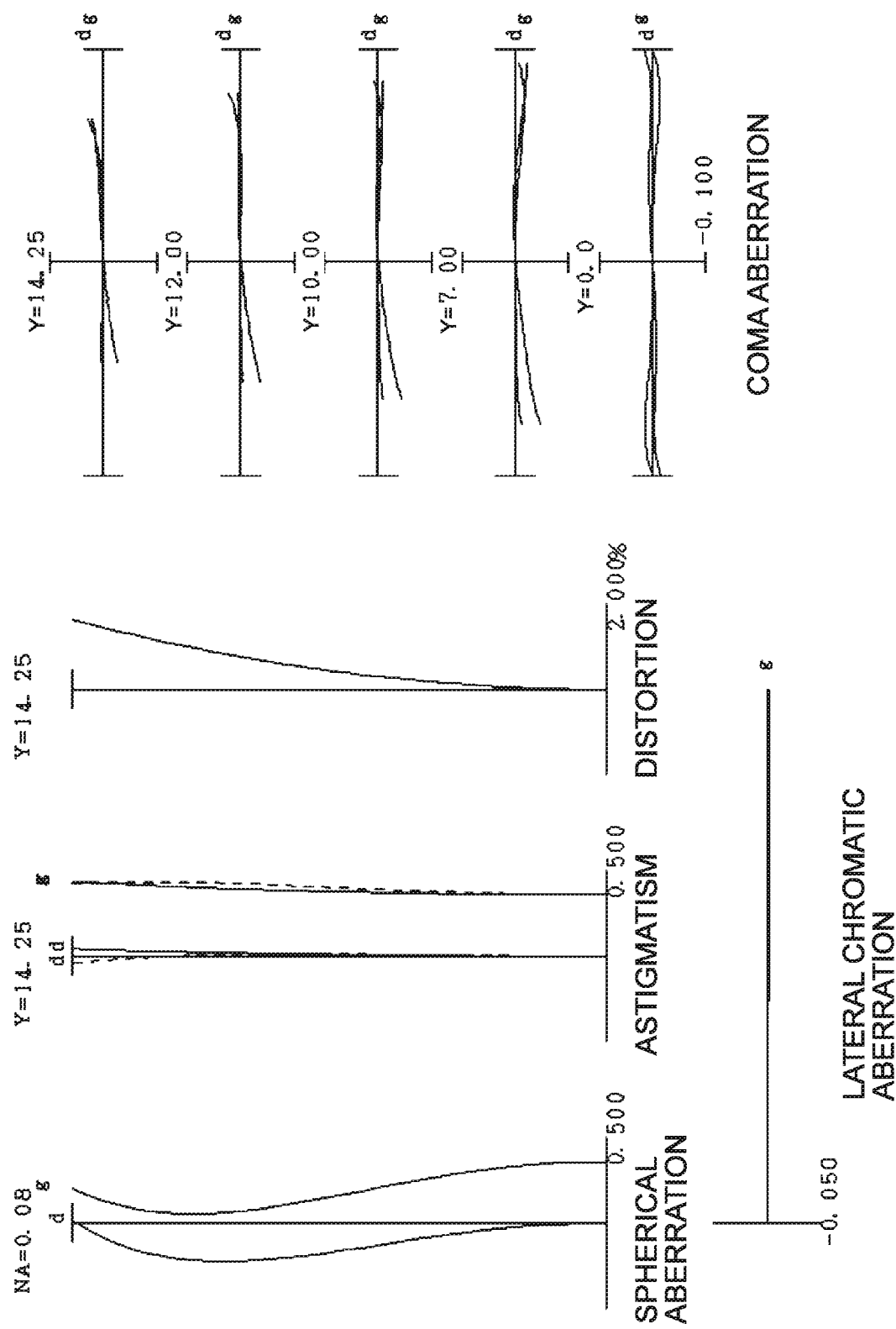

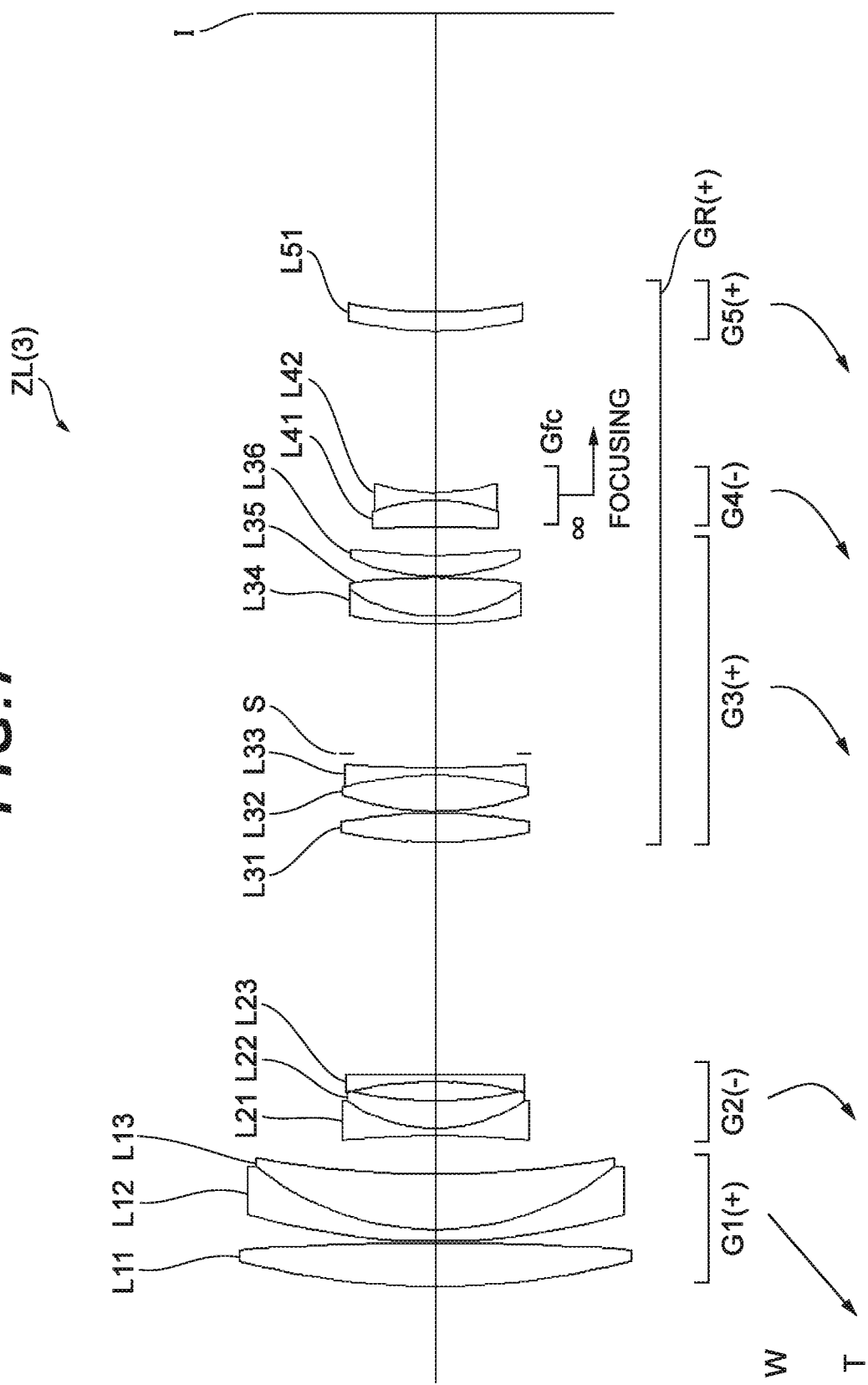

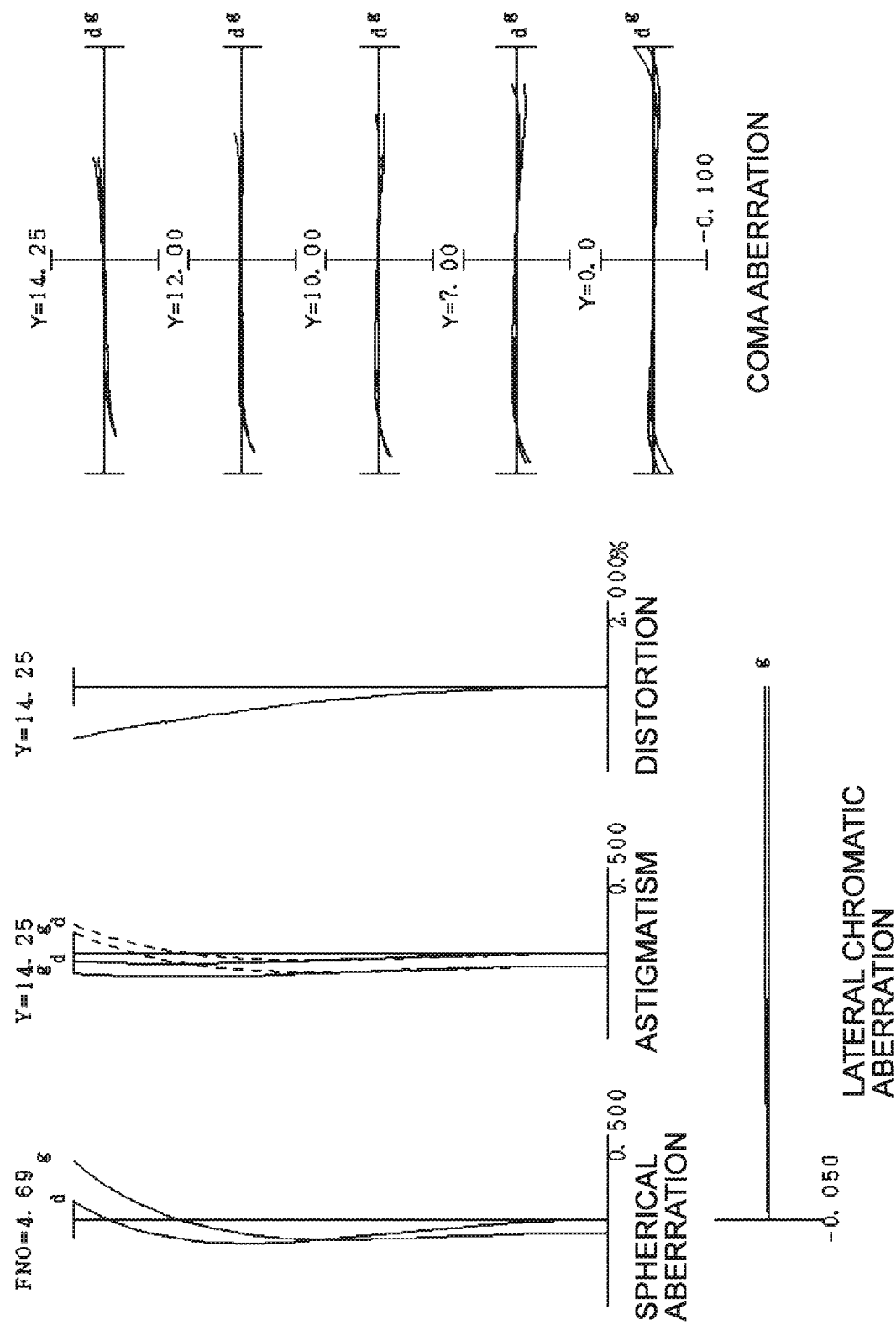

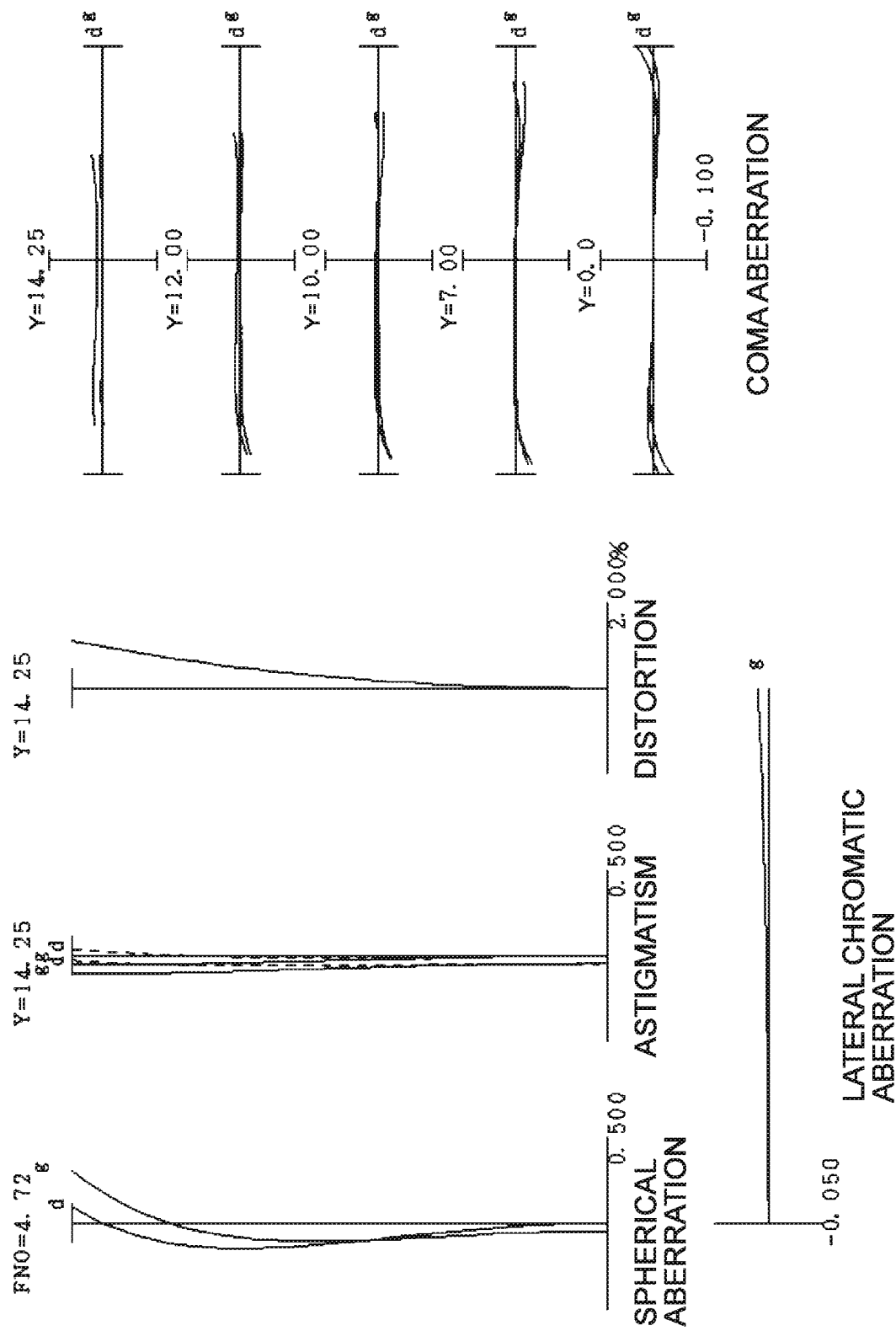

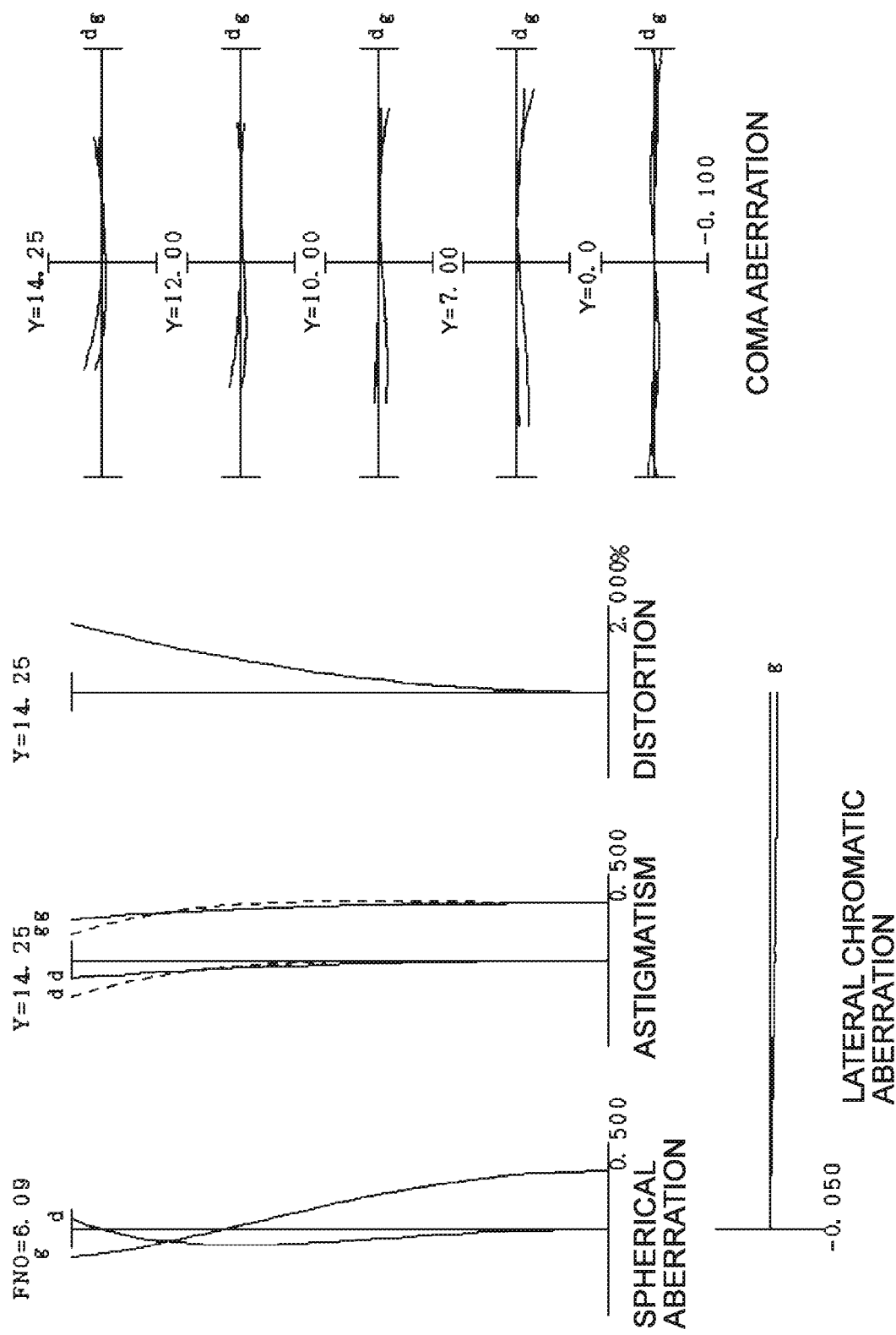

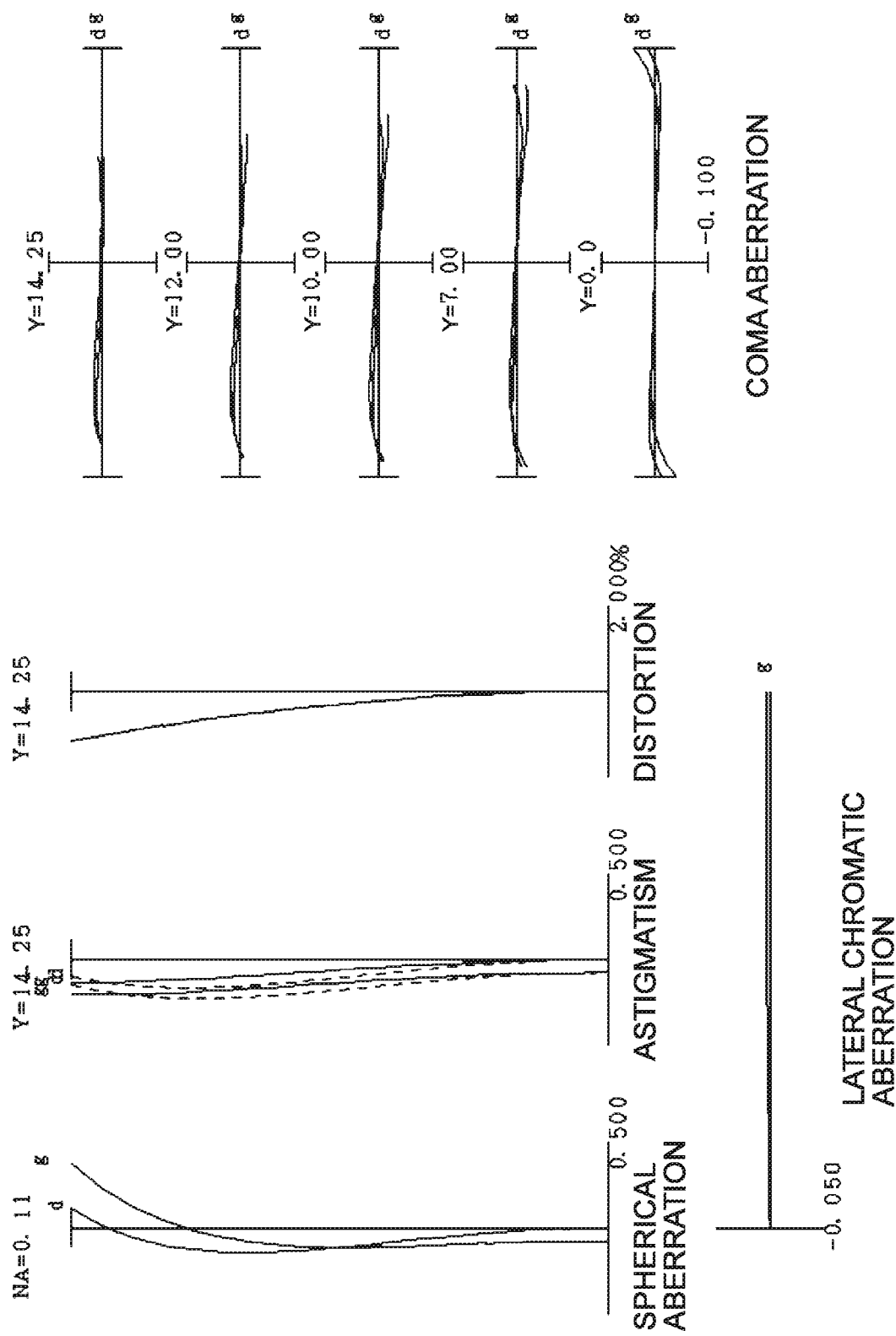

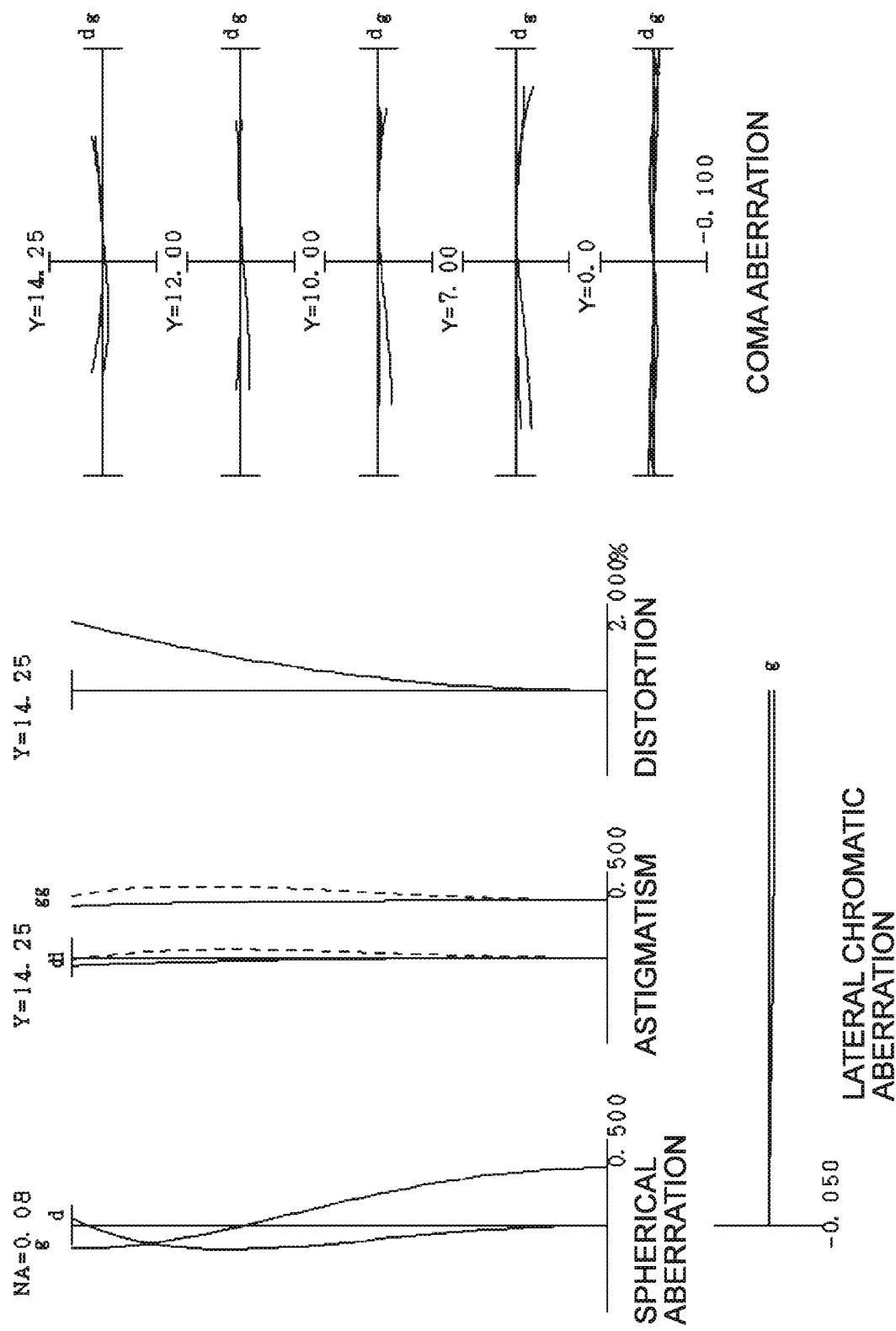

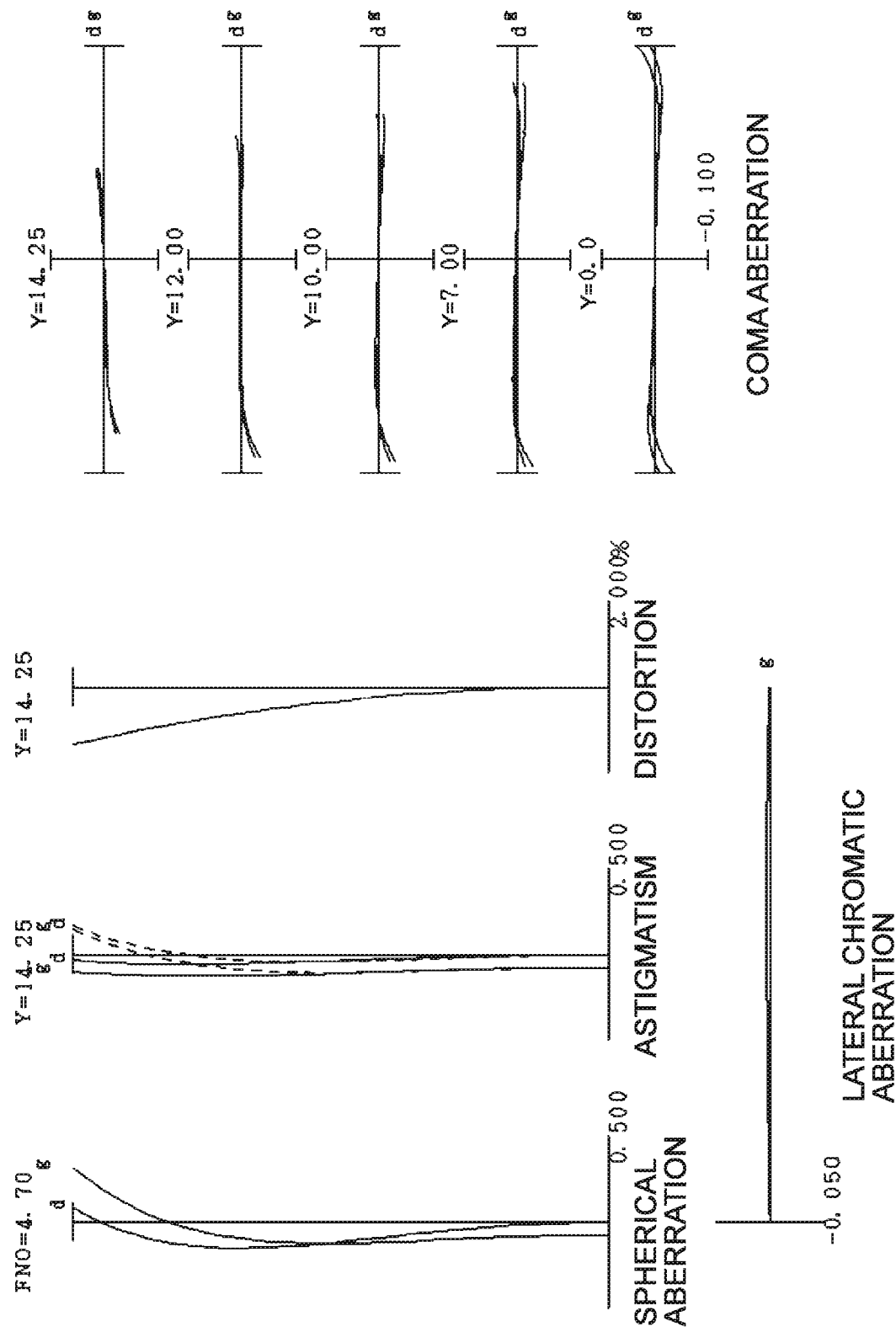

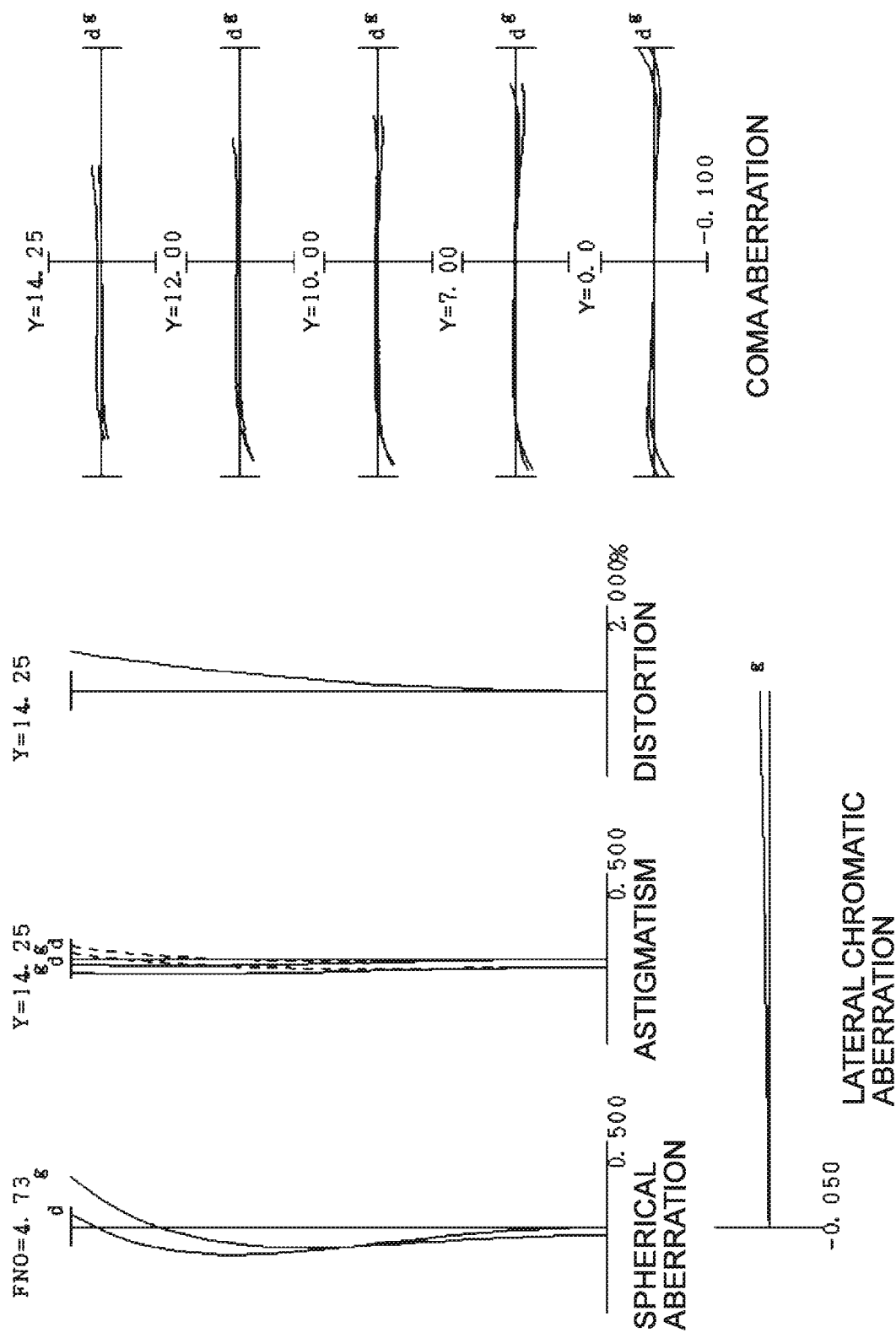

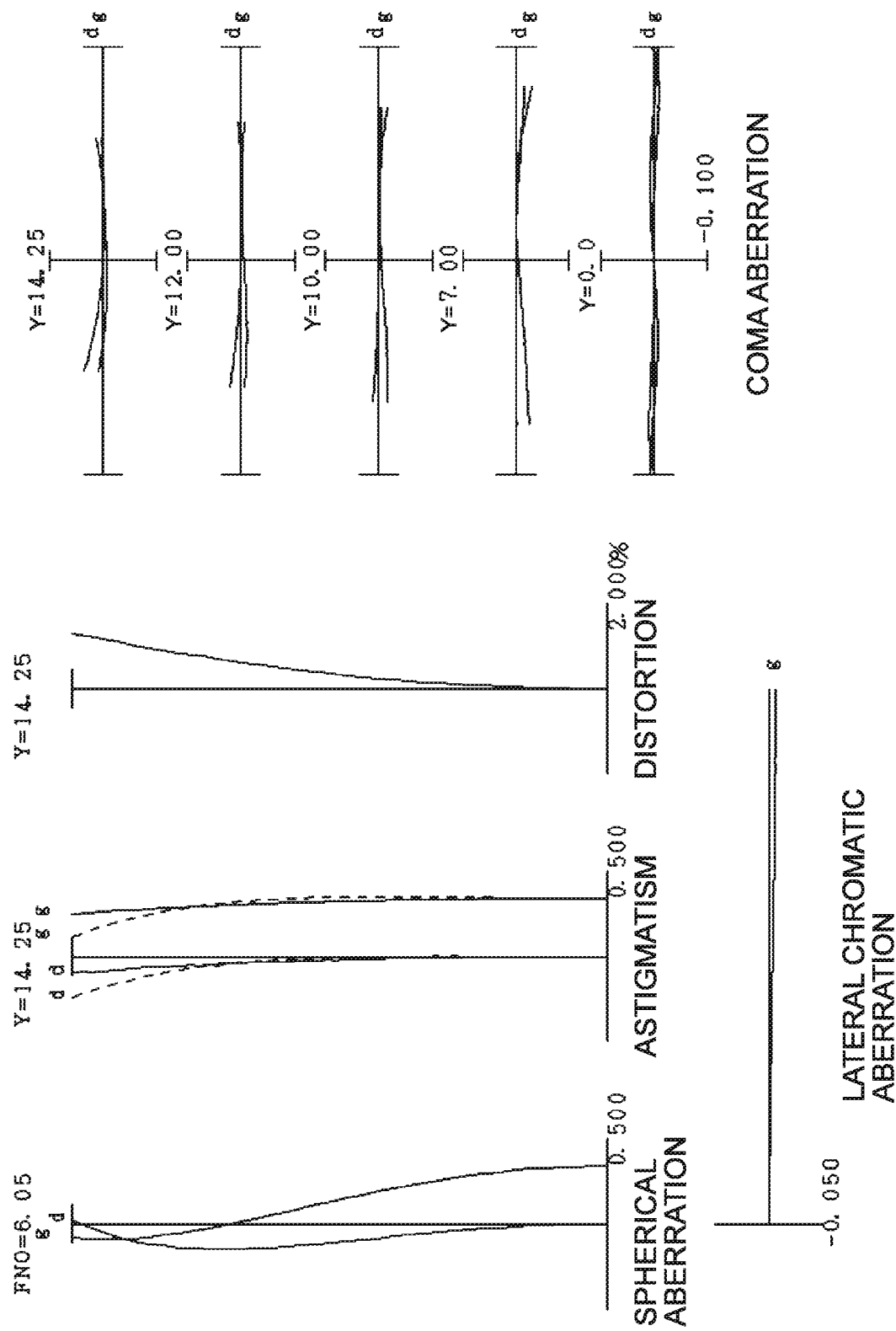

ZOOM OPTICAL SYSTEM, OPTICAL APPARATUS AND METHOD FOR MANUFACTURING THE ZOOM OPTICAL SYSTEM

TECHNICAL FIELD

The present invention relates to a zoom optical system, an optical apparatus using the same and a method for manufacturing the zoom optical system.

TECHNICAL BACKGROUND

A zoom optical system suitable for photographic cameras, electronic still cameras, video cameras, and the like has conventionally been proposed (see, for example, Patent Document 1). Optical performance of such a conventional zoom optical system has been insufficient.

PRIOR ARTS LIST

Patent Document

Patent Document 1: Japanese Laid-Open Patent Publication No. H4-293007 (A)

SUMMARY OF THE INVENTION

A zoom optical system according to the present invention comprises, in order from an object: a first lens group having positive refractive power; a second lens group having negative refractive power; and a subsequent group including at least one lens group. Upon zooming, distances between the first lens group and the second lens group and between the second lens group and the subsequent group change. The subsequent group comprises a focusing group having negative refractive power for focusing. The first lens group comprises a 1-1st lens that has positive refractive power and is disposed closest to the object. A following conditional expression is satisfied:

$$0.20 < f1/fR < 0.85$$

where, f1 denotes a focal length of the first lens group, and fR denotes a focal length of a lens component, in the subsequent group, closest to an image surface.

An optical apparatus according to the present invention comprises the zoom optical system described above.

A method for manufacturing a zoom optical system according to the present invention is a method for manufacturing a zoom optical system comprising, in order from an object: a first lens group having positive refractive power; a second lens group having negative refractive power; and a subsequent group including at least one lens group. The method comprises a step of arranging the lens groups in a lens barrel so that; upon zooming, distances between the first lens group and the second lens group and between the second lens group and the subsequent group change, the subsequent group comprises a focusing group having negative refractive power for focusing, the first lens group comprises a 1-1st lens that has positive refractive power and is disposed closest to the object, and a following conditional expression is satisfied:

$$0.20 < f1/fR < 0.85$$

where, f1 denotes a focal length of the first lens group, and fR denotes a focal length of a lens component, in the subsequent group, closest to an image surface

BRIEF DESCRIPTION OF THE DRAWINGS

FIGS. 2A, 2B, and 2C are graphs showing various aberrations of the zoom optical system according to Example 1 upon focusing on infinity, respectively in a wide angle end state, an intermediate focal length state, and a telephoto end state.

FIGS. 3A, 3B, and 3C are graphs showing various aberrations of the zoom optical system according to Example 1 upon focusing on a short distant object, respectively in the wide angle end state, the intermediate focal length state, and the telephoto end state.

FIGS. 5A, 5B, and 5C are graphs showing various aberrations of the zoom optical system according to Example 2 upon focusing on infinity, respectively in the wide angle end state, the intermediate focal length state, and the telephoto end state.

FIGS. 6A, 6B, and 6C are graphs showing various aberrations of the zoom optical system according to Example 2 upon focusing on a short distant object, respectively in the wide angle end state, the intermediate focal length state, and the telephoto end state.

FIG. 7 is a diagram illustrating a lens configuration of a zoom optical system according to Example 3 of the present embodiment.

FIGS. 8A, 8B, and 8C are graphs showing various aberrations of the zoom optical system according to Example 3 upon focusing on infinity, respectively in the wide angle end state, the intermediate focal length state, and the telephoto end state.

FIGS. 9A, 9B, and 9C are graphs showing various aberrations of the zoom optical system according to Example 3 upon focusing on a short distant object, respectively in the wide angle end state, the intermediate focal length state, and the telephoto end state.

FIGS. 11A, 11B, and 11C are graphs showing various aberrations of the zoom optical system according to Example 4 upon focusing on infinity, respectively in the wide angle end state, the intermediate focal length state, and the telephoto end state.

DESCRIPTION OF THE EMBODIMENTS

Figure 1:
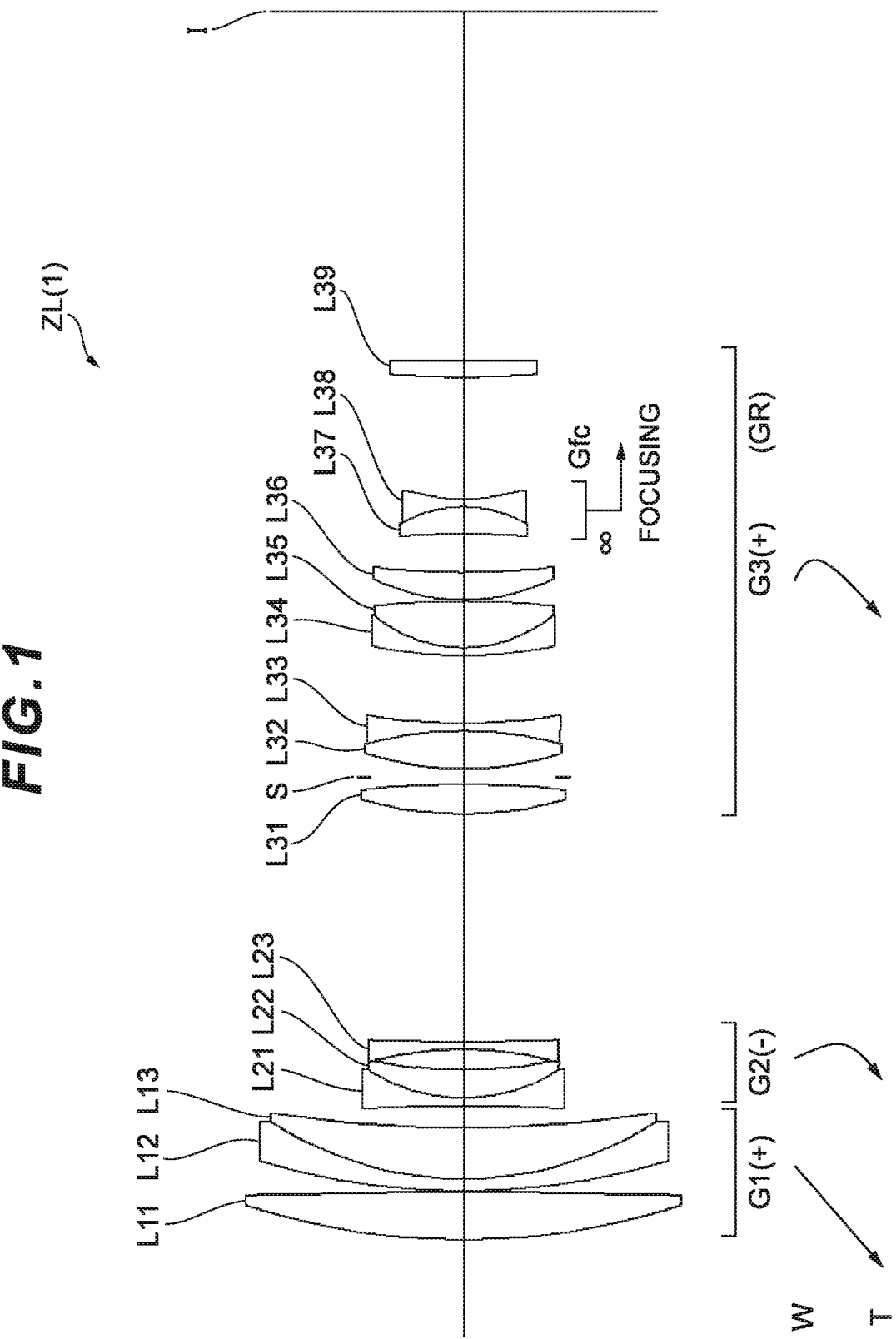
FIG. 1 is a diagram illustrating a lens configuration of a zoom optical system according to Example 1 of the present embodiment.

A zoom optical system and an optical apparatus according to the present embodiment are described below with reference to the drawings. As illustrated in FIG. 1, a zoom optical system ZL(1) as an example of a zoom optical system (zoom lens) ZL according to the present embodiment comprises, in order from an object: a first lens group G1 having positive refractive power; a second lens group G2 having negative refractive power; and a subsequent group GR (third lens group G3) including at least one lens group. Upon zooming, distances between the first lens group G1 and the second lens group G2 and between the second lens group G2 and the subsequent group GR change. The subsequent group GR comprises a focusing group Gfc having negative refractive power for focusing (moves upon focusing on a short distant object from an infinite distant object). The first lens group G1 comprises a 1-1st lens L11 that has positive refractive power and is disposed closest to the object. The third lens group G3 has positive refractive power.

Figure 4:
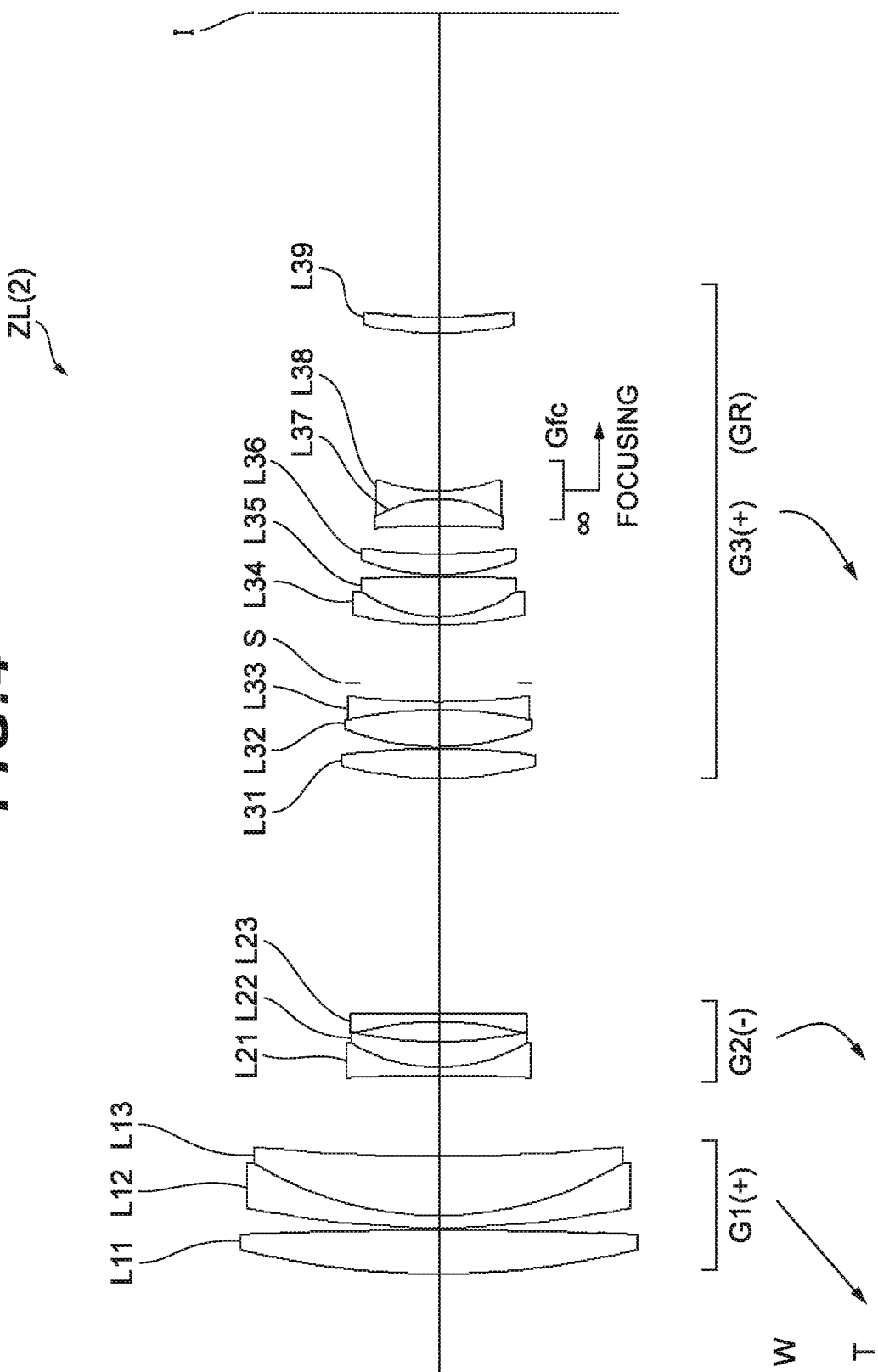
FIG. 4 is a diagram illustrating a lens configuration of a zoom optical system according to Example 2 of the present embodiment.
Figure 10:
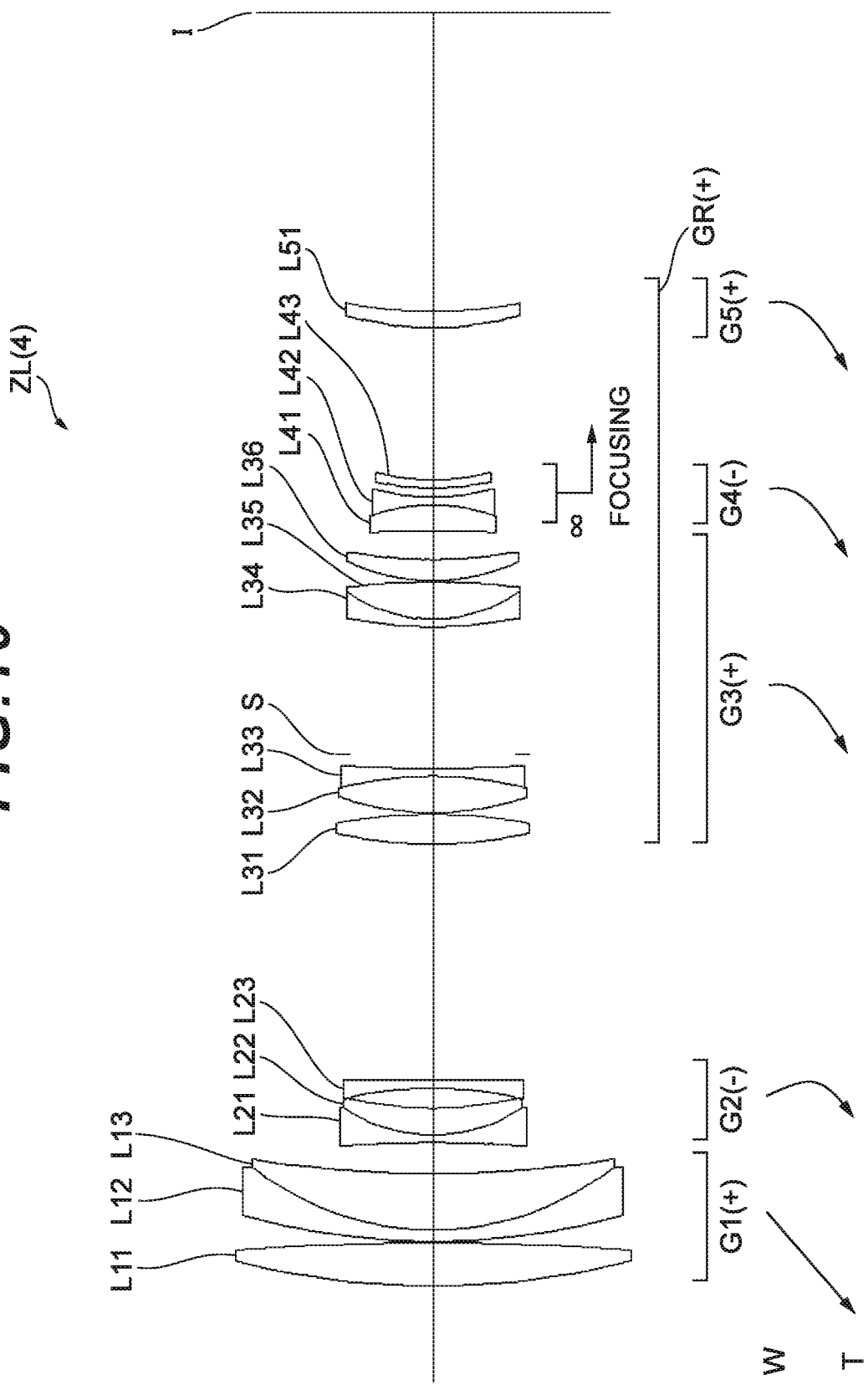
FIG. 10 is a diagram illustrating a lens configuration of a zoom optical system according to Example 4 of the present embodiment.

The zoom optical system ZL according to the present embodiment may also be a zoom optical system ZL(2) illustrated in FIG. 4, a zoom optical system ZL(3) illustrated in FIG. 7, or a zoom optical system ZL(4) illustrated in FIG. 10. The zoom optical system ZL(2) comprises the first lens group G1, the second lens group G2, and the subsequent group GR. The subsequent group GR consists of the third lens group G3, as in the case of the zoom optical system ZL(1). While in the zoom optical systems ZL(3) and ZL(4), the subsequent group GR consists of the third lens group G3, a fourth lens group G4, and a fifth lens group G5 respectively.

The zoom optical system ZL according to the present embodiment comprises at least three lens groups, and the distances among the lens groups change upon zooming. Thus, successful aberration correction can be achieved upon zooming. The focusing group Gfc is disposed in the subsequent group GR, and thus can be small and light weight. Preferably, the focusing group Gfc comprises three or less lenses. However, this should not be construed in a limiting sense.

With the 1-1st lens L11 having positive refractive power and being disposed closest to the object in the first lens group G1, a spherical aberration in a telephoto end state can be successfully corrected. The 1-1st lens L11 may be a single lens or may be cemented with another lens to be a part of a cemented lens.

The subsequent group GR comprises at least one lens group, and preferably has positive refractive power as a whole. Examples of the configuration of the lens group forming the subsequent group GR include a configuration consisting of a third lens group having positive refractive power; a configuration consisting of a third lens group having positive refractive power, a fourth lens group having negative refractive power, and a fifth lens group having positive refractive power; and a configuration consisting of a third lens group having negative refractive power, a fourth lens group having positive refractive power, a fifth lens group having negative refractive power, and a sixth lens group having positive refractive power. The distance among the lens groups forming the subsequent group GR changes at least upon zooming.

When the focusing group Gfc is disposed in the subsequent group GR, the subsequent group GR preferably comprises a lens disposed to an object side of the focusing group Gfc and a lens disposed to an image side of the focusing group Gfc.

The zoom optical system ZL according to the present embodiment having the configuration described above preferably satisfies the following conditional expression.

$$0.20 < f1/fR < 0.85 \quad (1)$$

where,
f1 denotes a focal length of the first lens group G1, and
fR denotes a focal length of a lens component, in the subsequent group GR, closest to an image surface.

The conditional expression (1) is for setting an appropriate range of a ratio between the focal lengths of the first lens group G1 and the lens component, in the subsequent group GR, closest to the image surface. Various aberrations including the spherical aberration can be successfully corrected when the conditional expression (1) is satisfied.

A value higher than the upper limit value of the conditional expression (1) leads to large refractive power of the lens component, in the subsequent group GR, closest to the image surface, resulting in extremely large distortion that is difficult to correct. The effects of the present embodiment can be more effectively guaranteed with the upper limit value of the conditional expression (1) set to be 0.80. To more effectively guarantee the effects of the present embodiment, the upper limit value of the conditional expression (1) is preferably set to be 0.75.

A value lower than the lower limit value of the conditional expression (1) leads to large refractive power of the first lens group G1, rendering various aberrations including the spherical aberration difficult to correct. The effects of the present embodiment can be more effectively guaranteed with the lower limit value of the conditional expression (1) set to be 0.30.

To more effectively guarantee the effects of the present embodiment, the lower limit value of the conditional expression (1) is preferably set to be 0.40.

The zoom optical system according to the present embodiment preferably satisfies the following conditional expression (2).

$$4.30 < f1/(-f2) < 5.00 \quad (2)$$

where,
f1 denotes a focal length of the first lens group G1, and
f2 denotes a focal length of the second lens group G2.

The conditional expression (2) is for setting an appropriate range of a ratio between the focal lengths of the first lens group G1 and the second lens group G2. Variation of various aberrations including the spherical aberration can be prevented upon zooming when the conditional expression (2) is satisfied.

A value higher than the upper limit value of the conditional expression (2) leads to large refractive power of the second lens group G2, rendering various aberrations including the spherical aberration difficult to correct. The effects of the present embodiment can be more effectively guaranteed with the upper limit value of the conditional expression (2) set to be 4.95. To more effectively guarantee the effects of the present embodiment, the upper limit value of the conditional expression (2) is preferably set to be 4.90.

A value lower than the lower limit value of the conditional expression (2) leads to large refractive power of the first lens group G1, rendering various aberrations including the spherical aberration difficult to correct. The effects of the present embodiment can be more effectively guaranteed with the lower limit value of the conditional expression (2) set to be 4.35. To more effectively guarantee the effects of the present embodiment, the lower limit value of the conditional expression (2) is preferably set to be 4.40.

The zoom optical system according to the present embodiment preferably has a configuration in which the first lens group G1 moves toward the object upon zooming from a wide angle end state to the telephoto end state. With this configuration, a short total length of the lenses in the wide angle end state can be achieved, whereby a small size of the zoom optical system can be achieved.

The zoom optical system according to the present embodiment preferably includes the focusing group Gfc including at least one lens having positive refractive power and at least one lens having negative refractive power. With this configuration, variation of various aberrations including the spherical aberration can be prevented upon focusing on a short distant object from an infinite distant object.

The zoom optical system according to the present embodiment preferably satisfies the following conditional expression (3).

$$1.00 < nFP/nFN < 1.20 \quad (3)$$

where, nFP denotes a refractive index of a lens with the largest positive refractive power in the focusing group Gfc, and nFN denotes a refractive index of a lens with the largest negative refractive power in the focusing group Gfc.

The conditional expression (3) is for defining an appropriate range of a ratio between the refractive indices of the lens with the largest positive refractive power and the lens with the largest negative refractive power in the focusing group Gfc. Variation of various aberrations including the spherical aberration can be prevented upon focusing when the conditional expression (3) is satisfied.

A value higher than the upper limit value of the conditional expression (3) leads to small refractive index of the lens with the largest negative refractive power, resulting in extremely large various aberrations including the spherical aberration upon focusing that are difficult to correct. The effects of the present embodiment can be more effectively guaranteed with the upper limit value of the conditional expression (3) set to be 1.18. To more effectively guarantee the effects of the present embodiment, the upper limit value of the conditional expression (3) is preferably set to be 1.13.

A value lower than the lower limit value of the conditional expression (3) leads to small refractive index of the lens with the largest positive refractive power, rendering variation of various aberrations including the spherical aberration upon focusing difficult to correct. The effects of the present embodiment can be more effectively guaranteed with the lower limit value of the conditional expression (3) set to be 1.01. To more effectively guarantee the effects of the present embodiment, the lower limit value of the conditional expression (3) is preferably set to be 1.02.

The zoom optical system according to the present embodiment preferably satisfies the following conditional expression (4).

$$0.52 < vFP/vFN < 0.82 \quad (4)$$

where, vFP denotes an Abbe number of the lens with the largest positive refractive power in the focusing group Gfc, and vFN denotes an Abbe number of the lens with the largest negative refractive power in the focusing group Gfc.

The conditional expression (4) is for defining an appropriate range of a ratio between the Abbe number of the lens with the largest positive refractive power and the Abbe number of the lens with the largest negative refractive power in the focusing group Gfc. Variation of a chromatic aberration can be prevented upon focusing when the conditional expression (4) is satisfied.

A value higher than the upper limit value of the conditional expression (4) leads to a small Abbe number of the lens with the largest negative refractive power, resulting in an extremely large chromatic aberration upon focusing that is difficult to correct. The effects of the present embodiment can be more effectively guaranteed with the upper limit value of the conditional expression (4) set to be 0.80. To more effectively guarantee the effects of the present embodiment, the upper limit value of the conditional expression (4) is preferably set to be 0.78.

A value lower than the lower limit value of the conditional expression (4) leads to a small Abbe number of the lens with the largest positive refractive power, rendering variation of the chromatic aberration upon focusing difficult to correct. The effects of the present embodiment can be more effectively guaranteed with the lower limit value of the conditional expression (4) set to be 0.54. To more effectively guarantee the effects of the present embodiment, the lower limit value of the conditional expression (4) is preferably set to be 0.56.

The zoom optical system according to the present embodiment preferably includes the first lens group G1 including, in order from an object: the 1-1st lens having positive refractive power; a 1-2nd lens having negative refractive power; and a 1-3rd lens having positive refractive power. With this configuration, the spherical aberration and the chromatic aberration can be successfully corrected.

The zoom optical system according to the present embodiment preferably includes the second lens group G2 including, in order from an object: a 2-1st lens having negative refractive power; a 2-2nd lens having positive refractive power; and a 2-3rd lens having negative refractive power. With this configuration, various aberrations including the spherical aberration can be successfully corrected.

Figure 13:
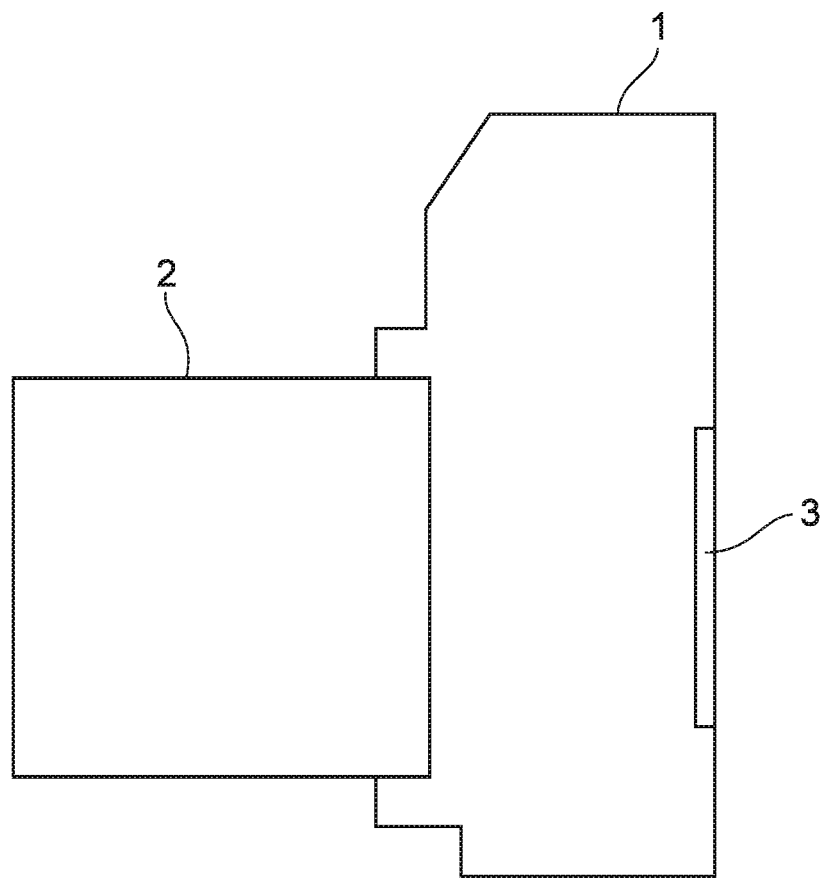
FIG. 13 is a diagram illustrating a configuration of a camera comprising the zoom optical system according to the present embodiment.

The optical apparatus according to the present embodiment includes the zoom optical system with the configuration described above. A camera (optical apparatus) including the zoom optical system ZL is described, as a specific example, with reference to FIG. 13. This camera 1 is a digital camera including the zoom optical system according to the present embodiment serving as an imaging lens 2 as illustrated in FIG. 13. In the camera 1, the imaging lens 2 collects light from an object (subject) (not illustrated), and then the light reaches an image sensor 3. Thus, an image based on the light from the subject is formed with the image sensor 3 to be stored as a subject image in a memory (not illustrated). In this manner, the photographer can capture an image of the subject with the camera 1. The camera may be a mirrorless camera, or may be a single lens reflex camera having a quick return mirror.

With the configuration described above, the camera 1 including the zoom optical system ZL serving as the imaging lens 2 can have a focus lens group that is small and light weight, and thus quick and silent AF can be achieved without using a large barrel. Furthermore, with this configuration, variation of aberrations upon zooming from the wide angle end state to the telephoto end state, as well as variation of aberrations upon focusing on a short distant object from an infinite distant object can be successfully prevented, whereby excellent optical performance can be implemented.

Figure 14:
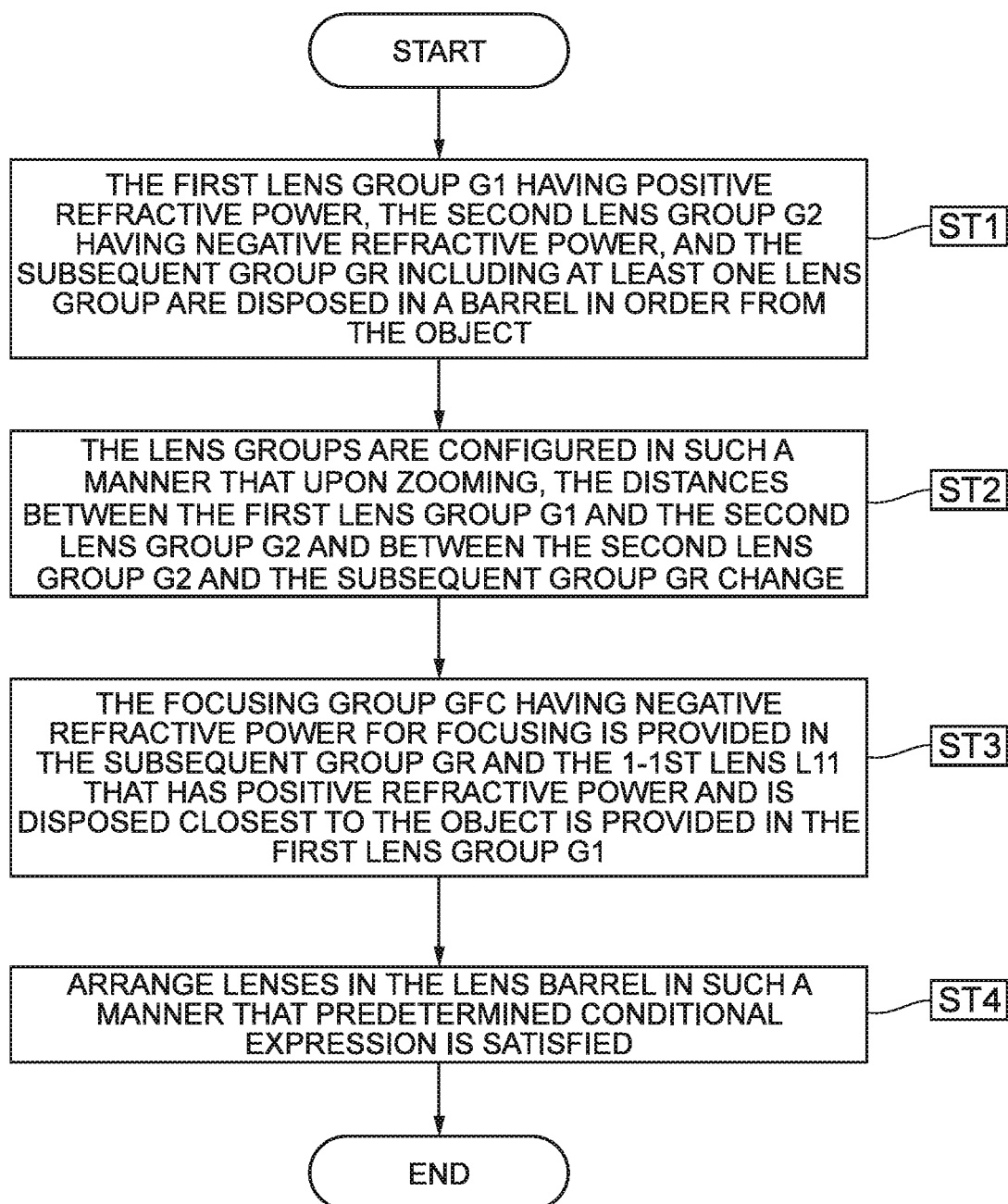
FIG. 14 is a flowchart illustrating a method for manufacturing the zoom optical system according to the present embodiment.

Next, a method for manufacturing the zoom optical system ZL described above is described with reference to FIG. 14. First of all, the first lens group G1 having positive refractive power, the second lens group G2 having negative refractive power, and the subsequent group GR including at least one lens group are disposed in a barrel in order from the object (step ST1). The lens groups are configured in such a manner that upon zooming, the distances between the first lens group G1 and the second lens group G2 and between the second lens group G2 and the subsequent group GR change (step ST2). The focusing group Gfc having negative refractive power for focusing is provided in the subsequent group GR and the 1-1st lens L11 that has positive refractive power and is disposed closest to the object is provided in the first lens group G1 (step ST3). The lenses are arranged in the lens barrel in such a manner that at least the conditional expression (1) described above is satisfied (step ST4).

EXAMPLES

Zoom optical systems (zoom lenses) ZL according to Examples of the present embodiment are described below with reference to the drawings. FIG. 1, FIG. 4, FIG. 7, and FIG. 10 are cross-sectional views illustrating configurations and refractive power distributions of the zoom optical systems ZL{ZL(1) to ZL(4)} according to Examples 1 to 4. In the lower portion of each cross-sectional view of the zoom optical systems ZL(1) to ZL(4), the directions in which the lens groups are moved along the optical axis upon zooming from the wide angle end state (W) to the telephoto end state (T) are shown by arrows. A direction in which the focusing group Gfc moves upon focusing on a short distant object from infinity is shown by an arrow appended with "focusing".

In FIGS. 1, 4, 7, and 10, a combination of a sign G and a number represents each lens group, and a combination of a sign L and a number represents each lens. In each Example, lens groups and the like are each denoted with a combination of the reference sign and numeral independently from other Examples to prevent cumbersomeness due to an excessively wide variety or a large number of signs and numerals. Thus, components in different Examples denoted with the same combination of reference sign and numeral does not necessarily have the same configuration.

Table 1 to Table 20 include Table 1 to Table 5 that are specification tables of Example 1, Table 6 to Table 10 that are specification tables of Example 2, Table 11 to Table 15 that are specification tables of Example 3, and Table 16 to Table 20 that are specification tables of Example 4. In Examples, d-line (wavelength 587.562 nm) and g-line (wavelength 435.835 nm) are selected as calculation targets of the aberration characteristics.

In Table [Lens specifications], a surface number represents an order of an optical surface from the object side in a traveling direction of a light beam, R represents a radius of curvature of each optical surface (with a surface having the center of curvature position on the image side provided with a positive value), D represents a distance between each optical surface and the next optical surface (or the image surface) on the optical axis, nd represents a refractive index of a material of an optical member with respect to the d-line, and vd represents an Abbe number of the material of the optical member based on the d-line. In the table, object surface represents an object surface, "∞" of the radius of curvature represents a plane or an aperture, (stop S) represents the aperture stop S, and image surface represents an image surface I. The refractive index nd=1.00000 of air is omitted.

Specifically, in Table [Various data], f represents a focal length of the whole zoom lens, FNo represents F number, 2ω represents an angle of view (ω represents a half angle of view (unit: °)), and Ymax represents the maximum image height. Back focus (BF) represents a distance between a lens last surface and the image surface I on the optical axis upon focusing on infinity, and TL represents a distance obtained by adding BF to a distance between a lens forefront surface and a lens last surface on the optical axis upon focusing on infinity. These values are provided for each of the zooming states including the wide angle end state (W), the intermediate focal length state (M), and the telephoto end state (T).

Table [Variable distance data] includes surface distances d5, d10, d21, and d24 corresponding to surfaces corresponding to surface numbers 5, 10, 21, and 24 appended with "variable" in Table [Lens specifications] and the next surface. The surface distances d5, d10, d21, and d24 are provided for each of the zooming states including the wide angle end state (W), the intermediate focal length state (M), and the telephoto end state (T) upon focusing on infinity and upon focusing on a short distant object.

Table [Lens group data] includes the group starting surface (surface closest to the object) and the focal length of each of the first to the third lens groups.

Table [Conditional expression corresponding value] includes values corresponding to the conditional expressions (1) to (4).

The focal length f, the radius of curvature R, the surface distance D and the other units of length described below as all the specification values, which are generally described with "mm" unless otherwise noted should not be construed in a limiting sense because the optical system proportionally expanded or reduced can have a similar or the same optical performance.

The description on the tables described above commonly applies to all Examples, and thus will not be redundantly given below.

Example 1

Example 1 is described with reference to FIG. 1, FIGS. 2A-2C, and FIGS. 3A-3C and Table 1 to Table 5. FIG. 1 is a diagram illustrating a lens configuration of a zoom optical system according to Example 1 of the present embodiment. The zoom optical system ZL(1) according to Example 1 consists of, in order from an object: a first lens group G1 having positive refractive power; a second lens group G2 having negative refractive power; and a third lens group G3 having positive refractive power. In this Example, the third lens group G3 forms the subsequent group GR. A sign (+) or (−) provided to a sign of each lens group represents refractive power of the lens group. The same applies to all of Examples described below. The aperture stop S is provided in the third lens group G3, and the image surface I is disposed to the image side of the third lens group G3.

The first lens group G1 consists of, in order from the object, a positive lens L11 having a biconvex shape and a cemented positive lens consisting of a negative meniscus lens L12 having a convex surface facing the object and a positive meniscus lens L13 having a convex surface facing the object.

The second lens group G2 consists of, in order from the object, a cemented negative lens consisting of a negative lens L21 having a biconcave shape and a positive meniscus lens L22 having a convex surface facing the object and a negative lens L23 having a biconcave shape.

The third lens group G3 consists of, in order from the object, a positive lens L31 having a biconvex shape, the aperture stop S, a cemented positive lens consisting of a positive lens L32 having a biconvex shape and a negative lens L33 having a biconcave shape, a cemented positive lens consisting of a negative meniscus lens L34 having a convex surface facing the object and a positive lens L35 having a biconvex shape, a positive meniscus lens L36 having a convex surface facing the object, a cemented negative lens consisting of a positive meniscus lens L37 having a concave surface facing the object and a negative lens L38 having a biconcave shape, and a positive lens L39 having a biconvex shape.

In the optical system according to Example 1, the cemented negative lens consisting of the positive meniscus lens L37 and the negative lens L38 in the third lens group G3 (subsequent group GR) moves toward the image surface upon focusing from a long distant object to a short distant object. In this Example, the second lens group G2 preferably serves as a vibration-proof lens group, with a displacement component in a direction orthogonal to the optical axis, to be in charge of image blur correction on the image surface I (image stabilization, camera shake correction).

Table 1 to Table 5 below list specification values of the optical system according to Example 1.

TABLE 1

[Lens specifications]

| Surface number | R | D | nd | vd |
|---|---|---|---|---|
| Object surface | ∞ | | | |
| 1 | 91.1552 | 6.167 | 1.51680 | 63.88 |
| 2 | −844.6033 | 0.204 | | |
| 3 | 92.5357 | 1.500 | 1.64769 | 33.73 |
| 4 | 45.6802 | 6.598 | 1.48749 | 70.31 |
| 5 | 154.0927 | Variable | | |
| 6 | −211.4795 | 1.000 | 1.69680 | 55.52 |
| 7 | 22.5821 | 3.677 | 1.80518 | 25.45 |
| 8 | 60.3602 | 2.652 | | |
| 9 | −46.9021 | 1.000 | 1.77250 | 49.62 |
| 10 | 299.7358 | Variable | | |
| 11 | 48.8916 | 3.796 | 1.69680 | 55.52 |
| 12 | −131.4333 | 1.000 | | |
| 13 | ∞ | 1.000 | (Aperture stop S) | |
| 14 | 39.8799 | 4.932 | 1.69680 | 55.52 |
| 15 | −49.6069 | 1.000 | 1.85026 | 32.35 |
| 16 | 72.3703 | 8.805 | | |
| 17 | 57.3477 | 1.000 | 1.80100 | 34.92 |
| 18 | 18.1075 | 6.038 | 1.48749 | 70.31 |
| 19 | −116.1586 | 0.200 | | |
| 20 | 26.5494 | 3.513 | 1.62004 | 36.40 |
| 21 | 96.5593 | Variable | | |
| 22 | −119.7021 | 3.510 | 1.74950 | 35.25 |
| 23 | −16.6839 | 1.000 | 1.69680 | 55.52 |
| 24 | 25.6230 | Variable | | |
| 25 | 124.9308 | 2.143 | 1.48749 | 70.31 |
| 26 | −480.8453 | BF | | |
| Image surface | ∞ | | | |

TABLE 2

[Various data]
Zooming rate 4.12

| | W | M | T |
|---|---|---|---|
| f | 71.4 | 100.0 | 294.0 |
| FNO | 4.56 | 4.26 | 5.89 |
| 2ω | 22.82 | 16.04 | 5.46 |
| Ymax | 14.25 | 14.25 | 14.25 |
| TL | 159.32 | 185.24 | 219.32 |
| BF | 45.32 | 39.43 | 70.09 |

TABLE 3

[Variable distance data]

| | W Infinity | M Infinity | T Infinity | W Short distant | M Short distant | T Short distant |
|---|---|---|---|---|---|---|
| d5 | 2.881 | 37.560 | 65.654 | 2.881 | 37.560 | 65.654 |
| d10 | 29.543 | 26.683 | 2.000 | 29.543 | 26.683 | 2.000 |
| d21 | 5.002 | 5.002 | 5.002 | 5.295 | 5.470 | 5.772 |
| d24 | 15.836 | 15.836 | 15.836 | 15.543 | 15.368 | 15.066 |

TABLE 4

[Lens group data]

| Group | Starting surface | f |
|---|---|---|
| G1 | 1 | 146.976 |
| G2 | 6 | −31.771 |
| G3 | 11 | 38.664 |

TABLE 5

[Conditional expression corresponding value]

Conditional expression (1)f1/fR = 0.722
Conditional expression (2)f1/(−f2) = 4.626
Conditional expression (3)nFP/nFN = 1.031
Conditional expression (4)vFP/vFN = 0.635

Figure 2B:
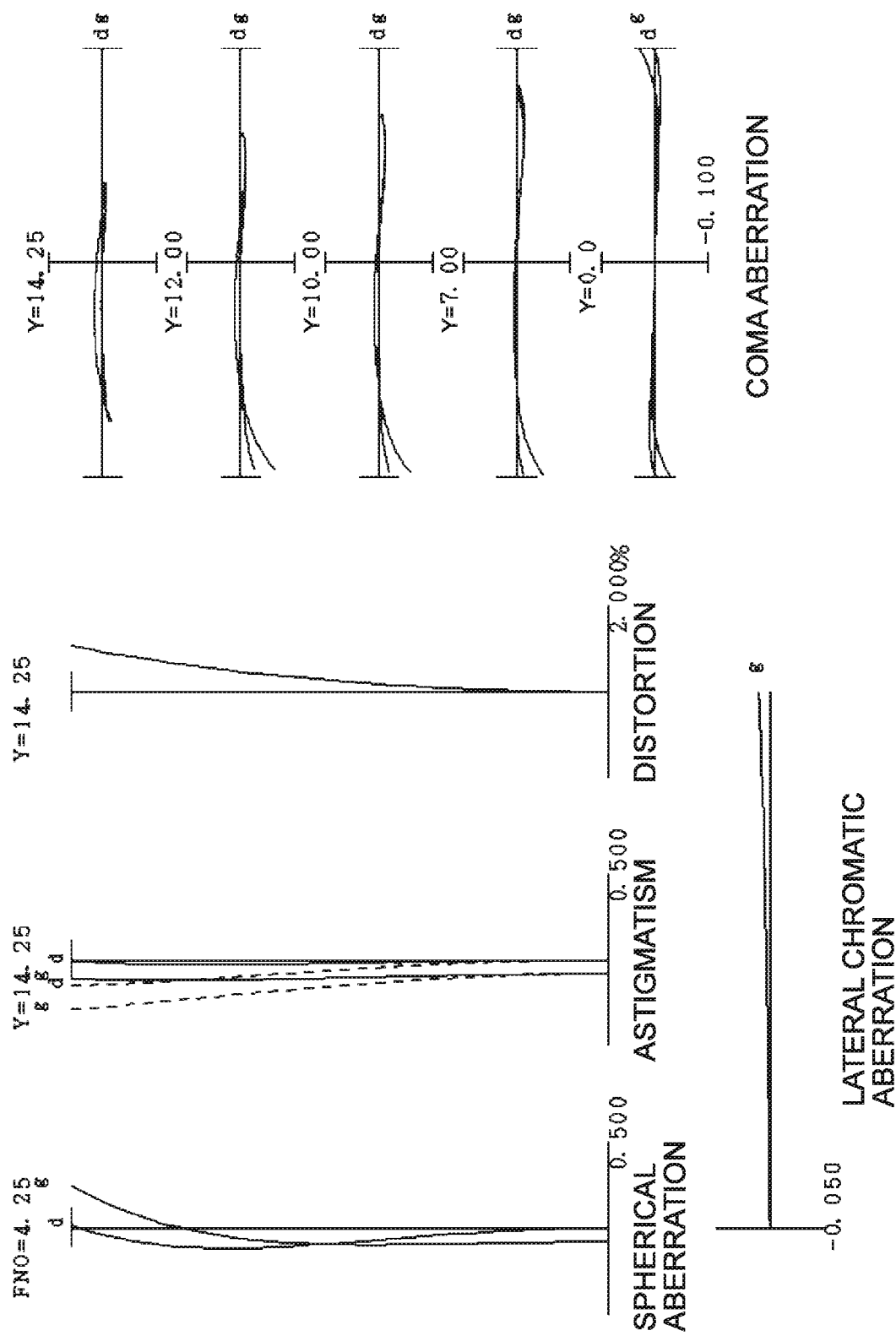

FIGS. 2A, 2B, and 2C are graphs showing various aberrations of the zoom optical system according to Example 1 upon focusing on infinity, respectively in the wide angle end state, the intermediate focal length state, and the telephoto end state.

Figure 3C:
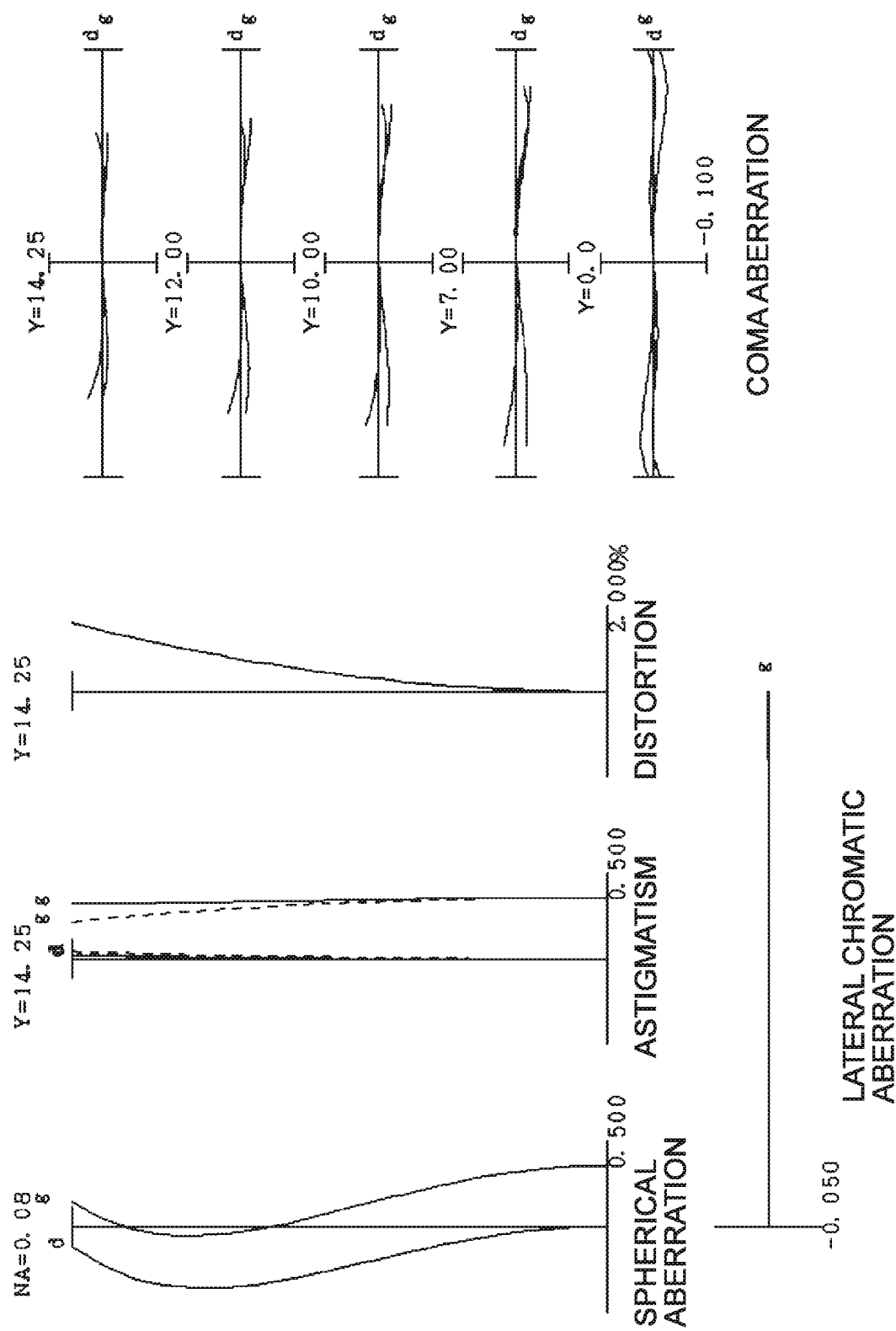

FIGS. 3A, 3B, and 3C are graphs showing various aberrations of the zoom optical system according to Example 1 upon focusing on a short distant object, respectively in the wide angle end state, the intermediate focal length state, and the telephoto end state.

In the aberration graphs in FIGS. 2A-2C and FIGS. 3A-3C, FNO denotes an F number, NA denotes the number of apertures, and Y denotes an image height. The spherical aberration graphs illustrate an F number or the number of apertures corresponding to the maximum aperture, astigmatism aberration graphs and distortion aberration graphs illustrate the maximum image height, and coma aberration graphs illustrate values of image heights. d denotes a d line ($\lambda$=587.6 nm) and g denotes a g line ($\lambda$=435.8 nm). In the astigmatism aberration graphs, a solid line represents a sagittal image surface, and a broken line represents a meridional image surface. In aberration graphs in Examples described below, the same reference signs as in this Example are used, and a redundant description is omitted.

It can be seen in these aberration graphs that the zoom optical system according to this Example can achieve excellent imaging performance with various aberrations successfully corrected from the wide angle end state to the telephoto end state, and can achieve excellent imaging performance upon focusing on a short distant object.

Example 2

Example 2 is described with reference to FIG. 4, FIGS. 5A-5C, and FIGS. 6A-6C and Table 6 to Table 10. FIG. 4 is a diagram illustrating a lens configuration of a zoom optical system according to Example 2 of the present embodiment. The zoom optical system ZL(2) according to Example 2 consists of, in order from an object: a first lens group G1 having positive refractive power; a second lens group G2 having negative refractive power; and a third lens group G3 having positive refractive power. In this Example, the third lens group G3 forms the subsequent group GR. The aperture stop S is provided in the third lens group G3, and the image surface I is disposed to the image side of the third lens group G3.

The first lens group G1 consists of, in order from the object, a positive lens L11 having a biconvex shape and a cemented positive lens consisting of a negative meniscus lens L12 having a convex surface facing the object and a positive meniscus lens L13 having a convex surface facing the object.

The second lens group G2 consists of, in order from the object, a cemented negative lens consisting of a negative lens L21 having a biconcave shape and a positive meniscus lens L22 having a convex surface facing the object and a negative meniscus lens L23 having a concave surface facing the object.

The third lens group G3 consists of, in order from the object, a positive lens L31 having a biconvex shape, a cemented positive lens consisting of a positive lens L32 having a biconvex shape and a negative lens L33 having a biconcave shape, the aperture stop S, a cemented positive lens consisting of a negative meniscus lens L34 having a convex surface facing the object and a positive lens L35 having a biconvex shape, a positive meniscus lens L36 having a convex surface facing the object, a cemented negative lens consisting of a positive meniscus lens L37 having a concave surface facing the object and a negative lens L38 having a biconcave shape, and a positive meniscus lens L39 having a convex surface facing the object.

In the optical system according to Example 2, the cemented negative lens consisting of the positive meniscus lens L37 and the negative lens L38 in the third lens group G3 (subsequent group GR) moves toward the image surface upon focusing from a long distant object to a short distant object. In this Example, the second lens group G2 preferably serves as a vibration-proof lens group, with a displacement component in a direction orthogonal to the optical axis, to be in charge of image blur correction on the image surface I (image stabilization, camera shake correction).

Table 6 to Table 10 below list specification values of the optical system according to Example 2.

TABLE 6

[Lens specifications]

| Surface number | R | D | nd | vd |
|---|---|---|---|---|
| Object surface | ∞ | | | |
| 1 | 107.1938 | 5.550 | 1.51680 | 63.88 |
| 2 | −530.9538 | 0.322 | | |
| 3 | 117.7624 | 1.500 | 1.62004 | 36.40 |
| 4 | 44.0268 | 7.567 | 1.51680 | 63.88 |
| 5 | 227.1507 | Variable | | |
| 6 | −203.0102 | 1.000 | 1.69680 | 55.52 |
| 7 | 21.2424 | 3.233 | 1.80518 | 25.45 |
| 8 | 48.8169 | 2.543 | | |
| 9 | −42.1537 | 1.000 | 1.69680 | 55.52 |
| 10 | −6934.7369 | Variable | | |
| 11 | 47.3275 | 3.788 | 1.58913 | 61.22 |
| 12 | −85.5332 | 0.200 | | |
| 13 | 32.0277 | 4.717 | 1.58913 | 61.22 |

TABLE 6-continued

[Lens specifications]

| Surface number | R | D | nd | vd |
|---|---|---|---|---|
| 14 | −50.8314 | 1.000 | 1.80100 | 34.92 |
| 15 | 86.4846 | 2.418 | | |
| 16 | ∞ | 7.395 | (Aperture stop S) | |
| 17 | 45.5887 | 1.000 | 1.80100 | 34.92 |
| 18 | 16.4065 | 5.108 | 1.48749 | 70.31 |
| 19 | −171.1242 | 0.227 | | |
| 20 | 27.3017 | 2.684 | 1.62004 | 36.40 |
| 21 | 74.0712 | Variable | | |
| 22 | −111.4238 | 3.422 | 1.62004 | 36.40 |
| 23 | −15.5060 | 1.000 | 1.56883 | 56.00 |
| 24 | 21.5605 | Variable | | |
| 25 | 44.9067 | 2.022 | 1.54814 | 45.79 |
| 26 | 69.6291 | BF | | |
| Image surface | ∞ | | | |

TABLE 7

[Various data]
Zooming rate 4.23

| | W | M | T |
|---|---|---|---|
| f | 69.5 | 100.0 | 294.0 |
| FNO | 4.68 | 4.68 | 6.21 |
| 2ω | 23.36 | 16.00 | 5.46 |
| Ymax | 14.25 | 14.25 | 14.25 |
| TL | 160.38 | 185.15 | 220.32 |
| BF | 38.70 | 38.69 | 64.27 |

TABLE 8

[Variable distance data]

| | W Infinity | M Infinity | T Infinity | W Short distant | M Short distant | T Short distant |
|---|---|---|---|---|---|---|
| d5 | 10.321 | 39.610 | 72.692 | 10.321 | 39.610 | 72.692 |
| d10 | 29.998 | 25.487 | 2.000 | 29.998 | 25.487 | 2.000 |
| d21 | 3.565 | 3.565 | 3.565 | 3.887 | 4.029 | 4.416 |
| d24 | 20.100 | 20.100 | 20.100 | 19.778 | 19.636 | 19.249 |

TABLE 9

[Lens group data]

| Group | Starting surface | f |
|---|---|---|
| G1 | 1 | 152.555 |
| G2 | 6 | −31.420 |
| G3 | 11 | 38.702 |

TABLE 10

[Conditional expression corresponding value]

Conditional expression (1)f1/fR = 0.680
Conditional expression (2)f1/(−f2) = 4.855
Conditional expression (3)nFP/nFN= 1.033
Conditional expression (4)vFP/vFN = 0.650

Figure 6B:
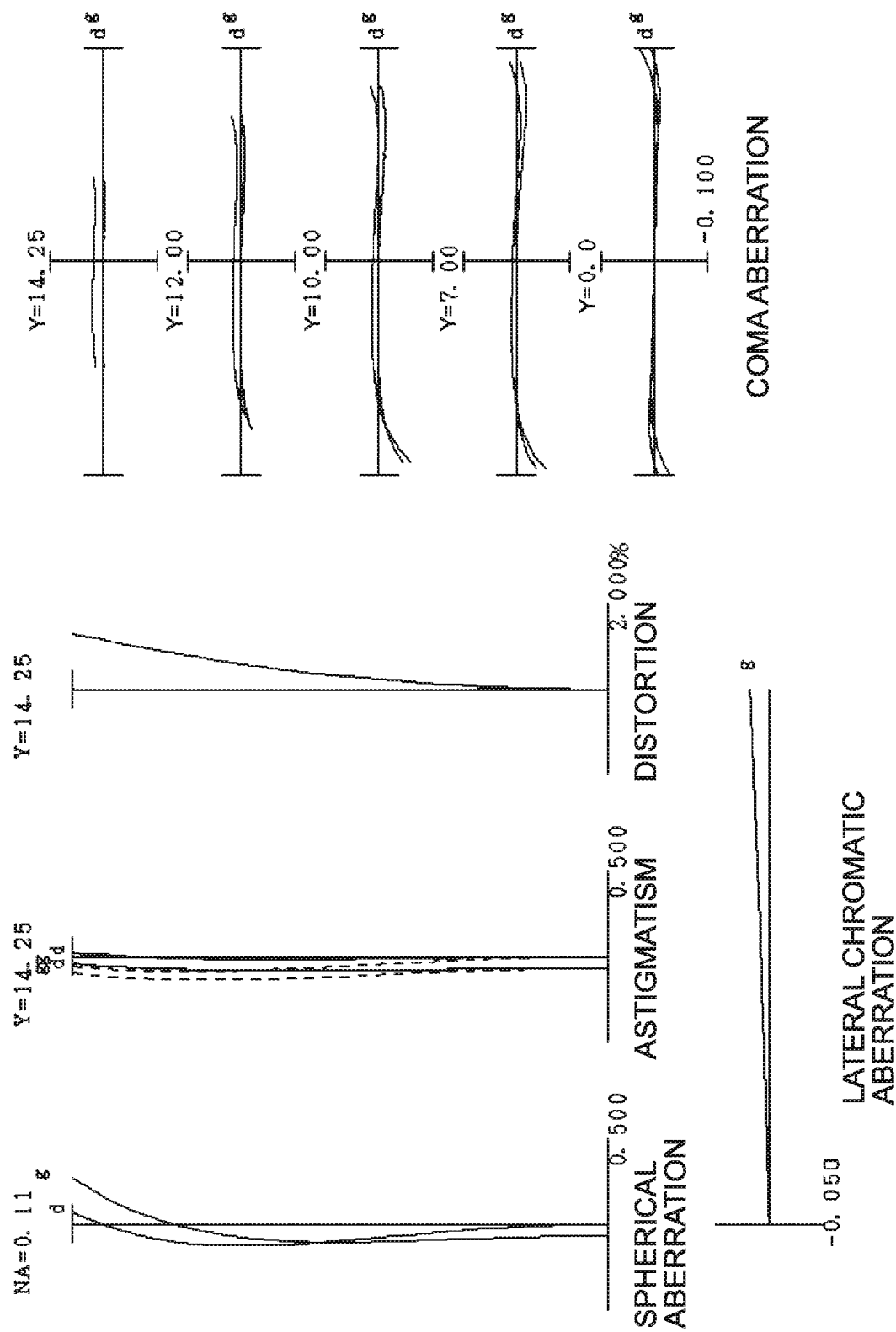

FIGS. 5A, 5B, and 5C are graphs showing various aberrations of the zoom optical system according to Example 2 upon focusing on infinity, respectively in the wide angle end state, the intermediate focal length state, and the telephoto end state. FIGS. 6A, 6B, and 6C are graphs showing various aberrations of the zoom optical system according to Example 2 upon focusing on a short distant object, respectively in the wide angle end state, the intermediate focal length state, and the telephoto end state. It can be seen in these aberration graphs that the zoom optical system according to this Example can achieve excellent imaging performance with various aberrations successfully corrected from the wide angle end state to the telephoto end state, and can achieve excellent imaging performance upon focusing on a short distant object.

Example 3

Example 3 is described with reference to FIG. 7, FIGS. 8A-8C, and FIGS. 9A-9C and Table 11 to Table 15. FIG. 7 is a diagram illustrating a lens configuration of a zoom optical system according to Example 3 of the present embodiment. The zoom optical system ZL(3) according to Example 3 consists of, in order from the object: a first lens group G1 having positive refractive power; a second lens group G2 having negative refractive power; a third lens group G3 having positive refractive power; a fourth lens group G4 having negative refractive power; and a fifth lens group G5 having positive refractive power. In this Example, the third to the fifth lens groups G3 to G5 form the subsequent group GR having positive refractive power as a whole.

The first lens group G1 consists of, in order from the object, a positive lens L11 having a biconvex shape and a cemented positive lens consisting of a negative meniscus lens L12 having a convex surface facing the object and a positive meniscus lens L13 having a convex surface facing the object.

The second lens group G2 consists of, in order from the object, a cemented negative lens consisting of a negative lens L21 having a biconcave shape and a positive meniscus lens L22 having a convex surface facing the object and a negative lens L23 having a biconcave shape.

The third lens group G3 consists of, in order from the object, a positive lens L31 having a biconvex shape, a cemented positive lens consisting of a positive lens L32 having a biconvex shape and a negative lens L33 having a biconcave shape, the aperture stop S, a cemented positive lens consisting of a negative meniscus lens L34 having a convex surface facing the object and a positive lens L35 having a biconvex shape, and a positive meniscus lens L36 having a convex surface facing the object.

The fourth lens group G4 consists of a cemented negative lens consisting of a positive meniscus lens L41 having a concave surface facing the object and a negative lens L42 having a biconcave shape.

The fifth lens group G5 consists of a positive meniscus lens L51 having a convex surface facing the object.

In the optical system according to Example 3, the fourth lens group G4 moves toward the image surface upon focusing from a long distant object to a short distant object. In this Example, the second lens group G2 preferably serves as a vibration-proof lens group, with a displacement component in a direction orthogonal to the optical axis, to be in charge of image blur correction on the image surface I (image stabilization, camera shake correction).

Table 11 to Table 15 below list specification values of the optical system according to Example 3.

TABLE 11

[Lens specifications]

| Surface number | R | D | nd | vd |
|---|---|---|---|---|
| Object surface | ∞ | | | |
| 1 | 100.0120 | 5.590 | 1.51680 | 63.88 |
| 2 | −356.7115 | 0.200 | | |
| 3 | 87.0822 | 1.500 | 1.62004 | 36.40 |
| 4 | 36.8924 | 7.184 | 1.51680 | 63.88 |
| 5 | 131.1594 | Variable | | |
| 6 | −122.1413 | 1.000 | 1.69680 | 55.52 |
| 7 | 20.4910 | 3.496 | 1.80518 | 25.45 |
| 8 | 49.8357 | 2.470 | | |
| 9 | −48.8699 | 1.000 | 1.77250 | 49.62 |
| 10 | 8360.2394 | Variable | | |
| 11 | 56.6713 | 3.785 | 1.58913 | 61.22 |
| 12 | −64.2309 | 0.200 | | |
| 13 | 35.4309 | 4.669 | 1.48749 | 70.31 |
| 14 | −48.4394 | 1.000 | 1.80100 | 34.92 |
| 15 | 159.7328 | 1.860 | | |
| 16 | ∞ | 16.684 | (Aperture stop S) | |
| 17 | 57.8297 | 1.000 | 1.80100 | 34.92 |
| 18 | 19.6163 | 4.946 | 1.48749 | 70.31 |
| 19 | −96.4204 | 0.200 | | |
| 20 | 27.1066 | 2.717 | 1.62004 | 36.40 |
| 21 | 65.2029 | Variable | | |
| 22 | −157.1131 | 3.395 | 1.64769 | 33.73 |
| 23 | −22.3553 | 1.000 | 1.56883 | 56.00 |
| 24 | 25.0407 | Variable | | |
| 25 | 46.5745 | 2.500 | 1.62004 | 36.40 |
| 26 | 60.0000 | BF | | |
| Image surface | ∞ | | | |

TABLE 12

[Various data]
Zooming rate 4.29

| | W | M | T |
|---|---|---|---|
| f | 68.6 | 100.0 | 294.0 |
| FNO | 4.69 | 4.72 | 6.10 |
| 2ω | 23.74 | 16.04 | 5.46 |
| Ymax | 14.25 | 14.25 | 14.25 |
| TL | 164.32 | 184.76 | 221.32 |
| BF | 38.52 | 38.73 | 64.73 |

TABLE 13

[Variable distance data]

| | W Infinity | M Infinity | T Infinity | W Short distant | M Short distant | T Short distant |
|---|---|---|---|---|---|---|
| d5 | 4.964 | 31.058 | 63.669 | 4.964 | 31.058 | 63.669 |
| d10 | 29.909 | 24.050 | 2.000 | 29.909 | 24.050 | 2.000 |
| d21 | 3.666 | 4.368 | 2.697 | 4.068 | 4.962 | 3.755 |
| d24 | 20.866 | 20.163 | 21.834 | 20.464 | 19.569 | 20.776 |

TABLE 14

[Lens group data]

| Group | Starting surface | f |
|---|---|---|
| G1 | 1 | 137.939 |
| G2 | 6 | −30.083 |

TABLE 14-continued

[Lens group data]

| Group | Starting surface | f |
|---|---|---|
| G3 | 11 | 34.644 |
| G4 | 22 | -42.585 |
| G5 | 25 | 313.363 |

TABLE 15

[Conditional expression corresponding value]

Conditional expression (1)f1/fR = 0.440
Conditional expression (2)f1/(-f2) = 4.585
Conditional expression (3)nFP/nFN = 1.050
Conditional expression (4)vFP/vFN = 0.602

Figure 9B:
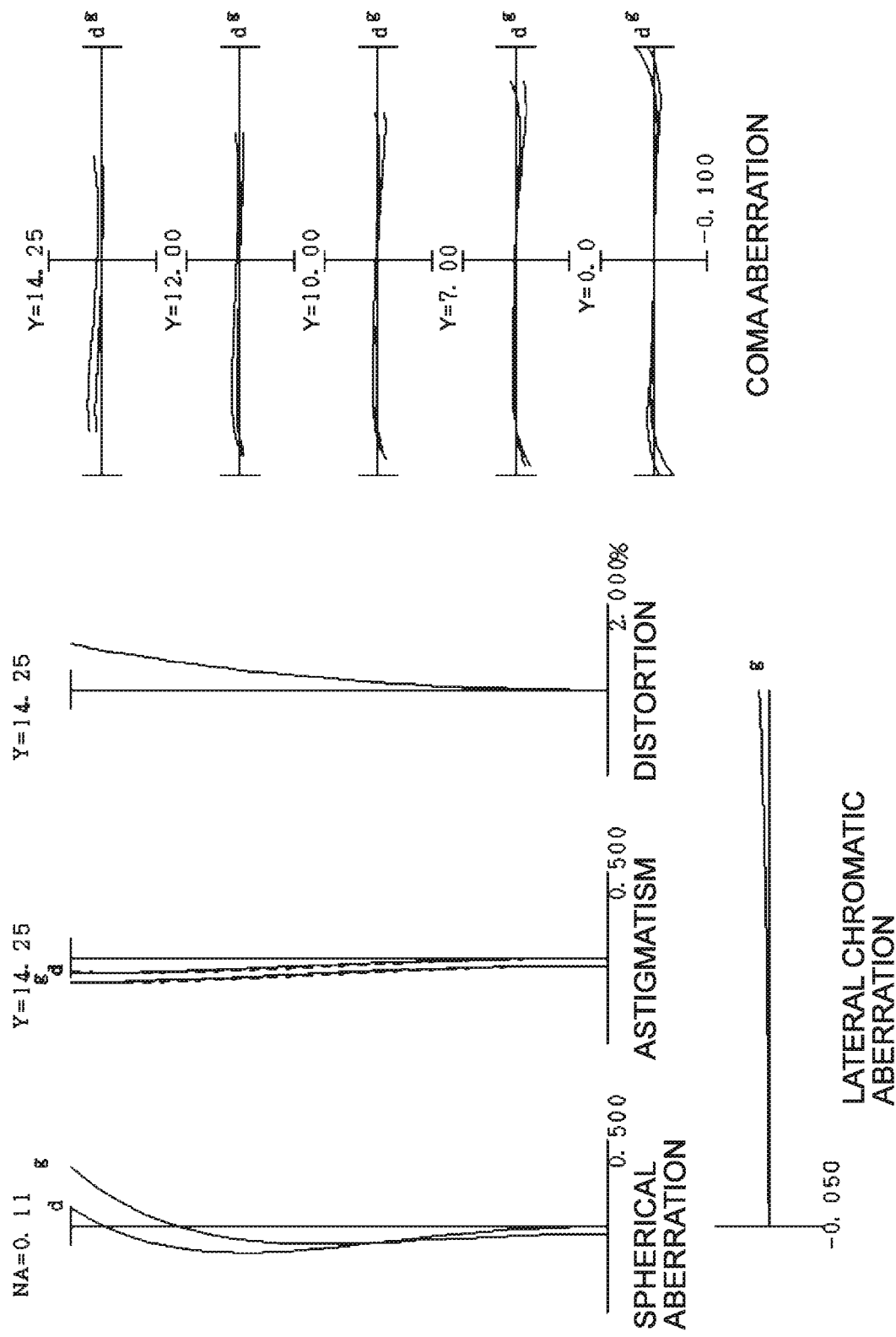

FIGS. 8A, 8B, and 8C are graphs showing various aberrations of the zoom optical system according to Example 3 upon focusing on infinity, respectively in the wide angle end state, the intermediate focal length state, and the telephoto end state. FIGS. 9A, 9B, and 9C are graphs showing various aberrations of the zoom optical system according to Example 3 upon focusing on a short distant object, respectively in the wide angle end state, the intermediate focal length state, and the telephoto end state. It can be seen in these aberration graphs that the zoom optical system according to this Example can achieve excellent imaging performance with various aberrations successfully corrected from the wide angle end state to the telephoto end state, and can achieve excellent imaging performance upon focusing on a short distant object.

Example 4

Example 4 is described with reference to FIG. 10, FIGS. 11A-11C, and FIGS. 12A-12C and Table 16 to Table 20. FIG. 10 is a diagram illustrating a lens configuration of a zoom optical system according to Example 4 of the present embodiment. The zoom optical system ZL(4) according to Example 4 consists of, in order from the object: a first lens group G1 having positive refractive power; a second lens group G2 having negative refractive power; a third lens group G3 having positive refractive power; a fourth lens group G4 having negative refractive power; and a fifth lens group G5 having positive refractive power. In this Example, the third to the fifth lens groups G3 to G5 form the subsequent group GR having positive refractive power as a whole.

The first lens group G1 consists of, in order from the object, a positive lens L11 having a biconvex shape and a cemented positive lens consisting of a negative meniscus lens L12 having a convex surface facing the object and a positive meniscus lens L13 having a convex surface facing the object.

The second lens group G2 consists of, in order from the object, a cemented negative lens consisting of a negative lens L21 having a biconcave shape and a positive meniscus lens L22 having a convex surface facing the object and a negative lens L23 having a biconcave shape.

The third lens group G3 consists of, in order from the object, a positive lens L31 having a biconvex shape, a cemented positive lens consisting of a positive lens L32 having a biconvex shape and a negative lens L33 having a biconcave shape, the aperture stop S, a cemented positive lens consisting of a negative meniscus lens L34 having a convex surface facing the object and a positive lens L35 having a biconvex shape, and a positive meniscus lens L36 having a convex surface facing the object.

The fourth lens group G4 consists of a cemented negative lens consisting of a positive meniscus lens L41 having a concave surface facing the object and a negative lens L42 having a biconcave shape and a negative meniscus lens L43 having a convex surface facing the object.

The fifth lens group G5 consists of a positive meniscus lens L51 having a convex surface facing the object.

In the optical system according to Example 4, the fourth lens group G4 moves toward the image surface upon focusing from a long distant object to a short distant object. In this Example, the second lens group G2 preferably serves as a vibration-proof lens group, with a displacement component in a direction orthogonal to the optical axis, to be in charge of image blur correction on the image surface I (image stabilization, camera shake correction).

Table 16 to Table 20 below list specification values of the optical system according to Example 4.

TABLE 16

[Lens specifications]

| Surface number | R | D | nd | vd |
|---|---|---|---|---|
| Object surface | ∞ | | | |
| 1 | 102.5193 | 5.542 | 1.51680 | 63.88 |
| 2 | -366.1796 | 0.200 | | |
| 3 | 90.4094 | 1.500 | 1.62004 | 36.40 |
| 4 | 37.8518 | 7.229 | 1.51680 | 63.88 |
| 5 | 144.7539 | Variable | | |
| 6 | -163.5053 | 1.000 | 1.69680 | 55.52 |
| 7 | 20.5835 | 3.475 | 1.80518 | 25.45 |
| 8 | 48.1602 | 2.598 | | |
| 9 | -47.4086 | 1.000 | 1.77250 | 49.62 |
| 10 | 4634.3570 | Variable | | |
| 11 | 57.6094 | 3.843 | 1.58913 | 61.22 |
| 12 | -66.7307 | 0.200 | | |
| 13 | 36.4629 | 4.709 | 1.48749 | 70.31 |
| 14 | -48.7603 | 1.000 | 1.80100 | 34.92 |
| 15 | 206.1449 | 1.786 | | |
| 16 | ∞ | 16.497 | (Aperture stop S) | |
| 17 | 55.1101 | 1.000 | 1.80100 | 34.92 |
| 18 | 19.3181 | 4.785 | 1.48749 | 70.31 |
| 19 | -100.3387 | 0.200 | | |
| 20 | 26.0254 | 2.707 | 1.62004 | 36.40 |
| 21 | 57.5286 | Variable | | |
| 22 | -201.9970 | 3.376 | 1.64769 | 33.73 |
| 23 | -22.7237 | 1.000 | 1.56883 | 56.00 |
| 24 | 29.2295 | 1.172 | | |
| 25 | 34.9681 | 1.000 | 1.79952 | 42.09 |
| 26 | 26.1166 | Variable | | |
| 27 | 39.9439 | 2.135 | 1.62004 | 36.40 |
| 28 | 60.0000 | BF | | |
| Image surface | ∞ | | | |

TABLE 17

[Various data]
Zooming rate 4.28

| | W | M | T |
|---|---|---|---|
| f | 68.7 | 100.0 | 294.0 |
| FNO | 4.70 | 4.73 | 6.06 |
| 2ω | 23.74 | 16.08 | 5.48 |
| Ymax | 14.25 | 14.25 | 14.25 |

TABLE 17-continued

[Various data]
Zooming rate 4.28

|  | W | M | T |
|---|---|---|---|
| TL | 164.32 | 184.47 | 221.32 |
| BF | 38.52 | 38.72 | 64.52 |

TABLE 18

[Variable distance data]

|  | W Infinity | M Infinity | T Infinity | W Short distant | M Short distant | T Short distant |
|---|---|---|---|---|---|---|
| d5 | 4.000 | 30.052 | 63.492 | 4.000 | 30.052 | 63.492 |
| d10 | 30.492 | 24.393 | 2.000 | 30.492 | 24.393 | 2.000 |
| d21 | 3.686 | 4.454 | 2.923 | 4.052 | 4.994 | 3.907 |
| d26 | 19.668 | 18.899 | 20.430 | 19.301 | 18.359 | 19.446 |

TABLE 19

[Lens group data]

| Group | Starting surface | f |
|---|---|---|
| G1 | 1 | 138.289 |
| G2 | 6 | −30.436 |
| G3 | 11 | 34.256 |
| G4 | 22 | −36.764 |
| G5 | 27 | 185.180 |

TABLE 20

[Conditional expression corresponding value]

Conditional expression (1)f1/fR = 0.747
Conditional expression (2)f1/(−f2) = 4.544
Conditional expression (3)nFP/nFN = 1.050
Conditional expression (4)vFP/vFN = 0.602

Figure 12A:
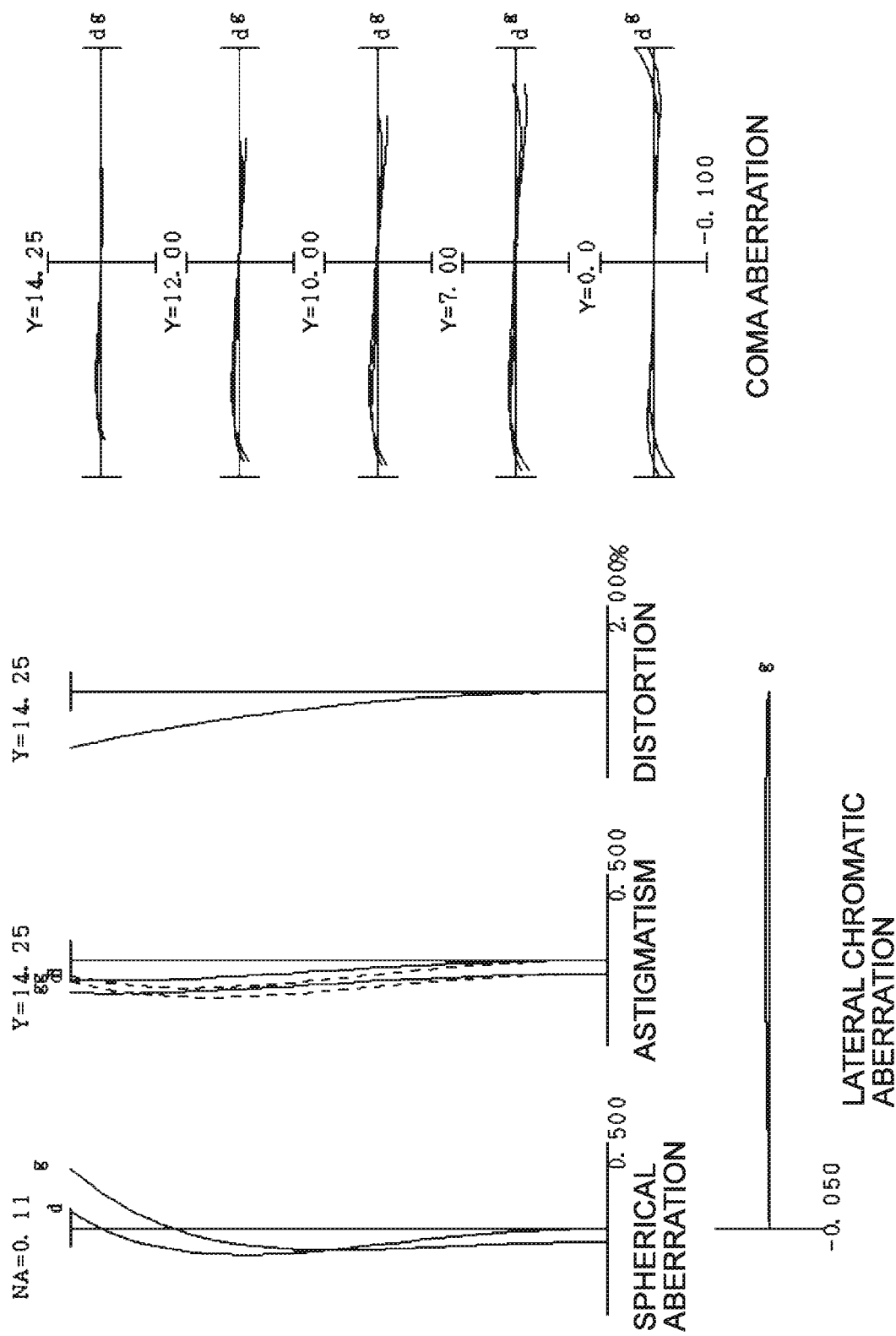
FIGS. 12A, 12B, and 12C are graphs showing various aberrations of the zoom optical system according to Example 4 upon focusing on a short distant object, respectively in the wide angle end state, the intermediate focal length state, and the telephoto end state.
Figure 12B:
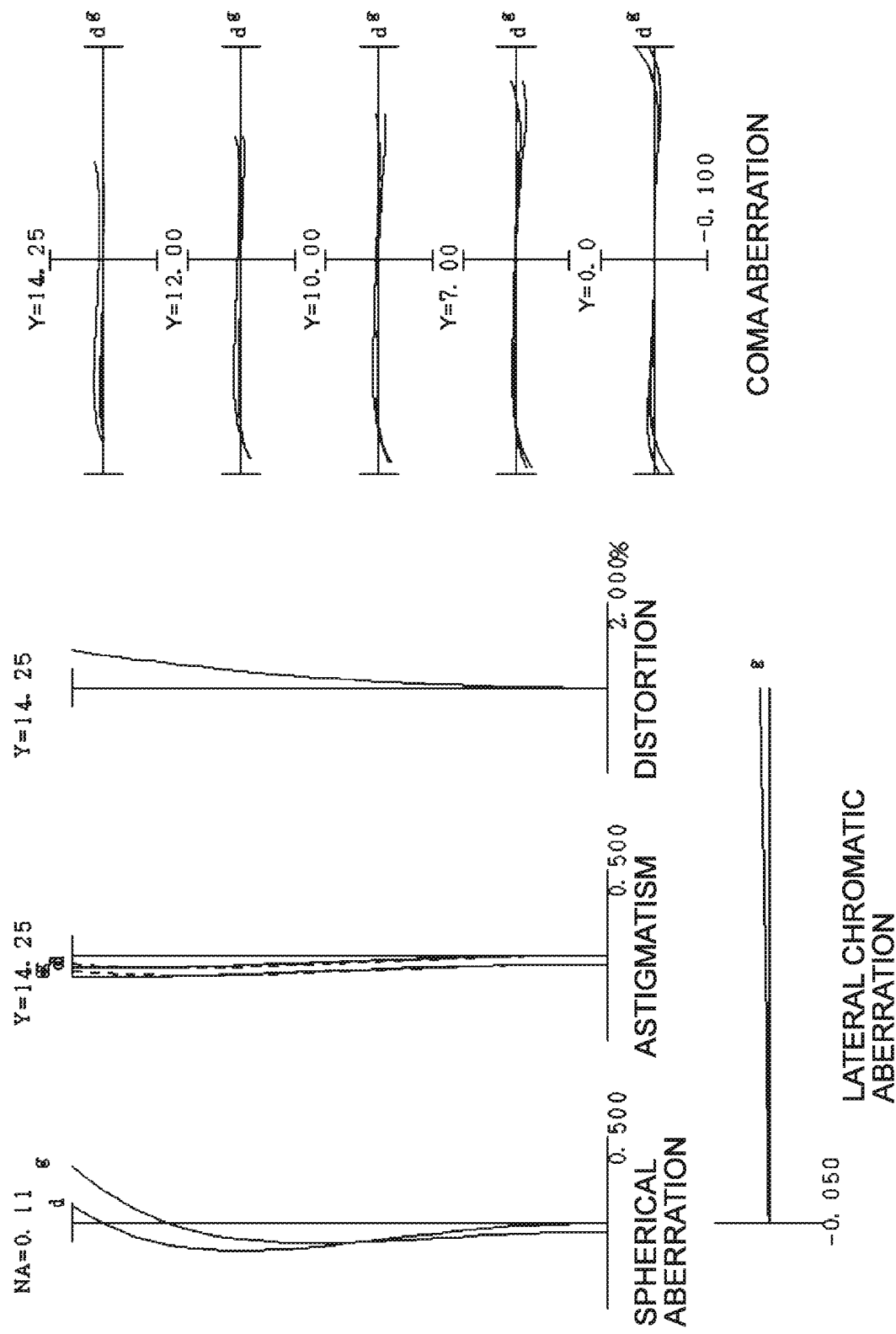
Figure 12C:
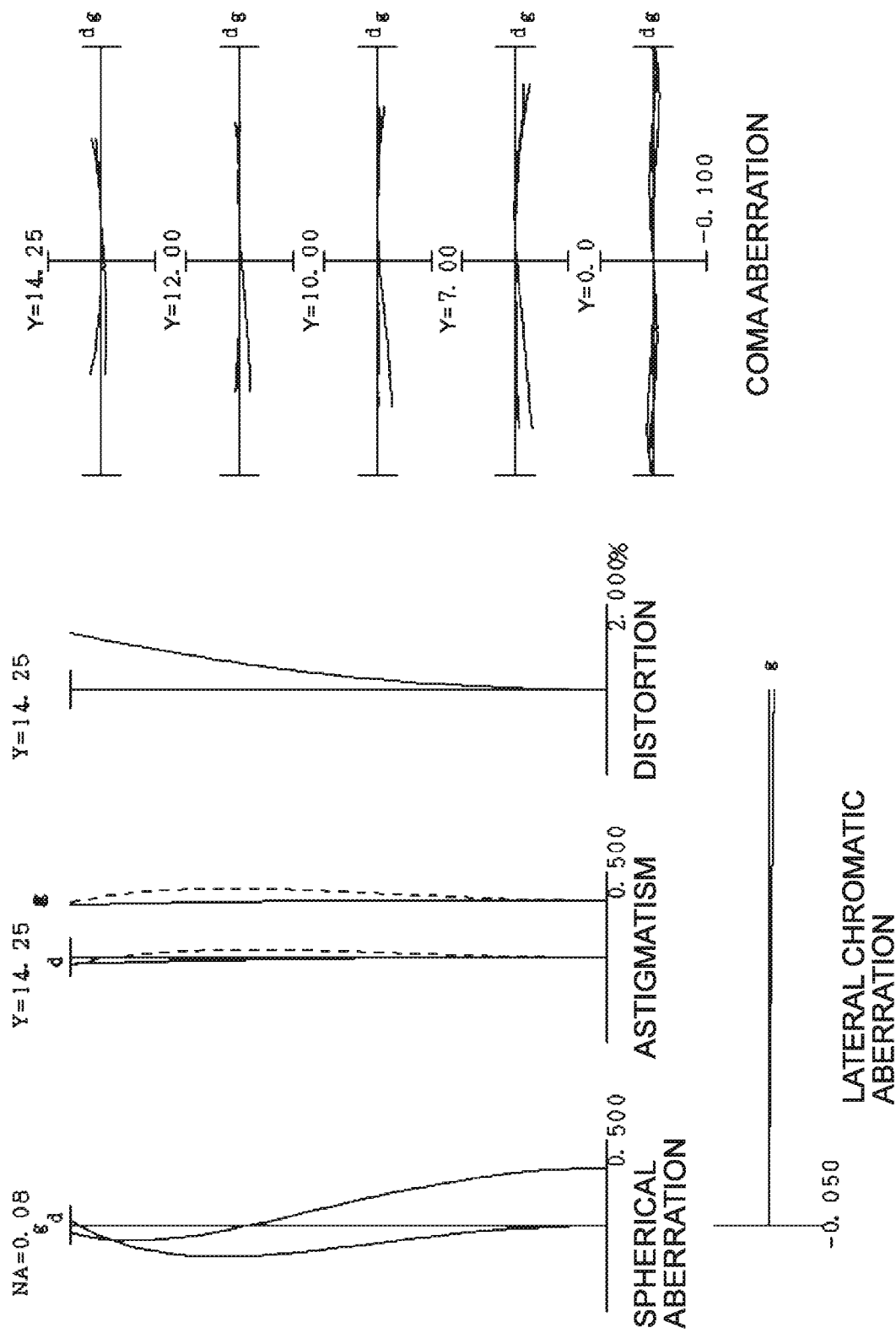

FIGS. 11A, 11B, and 11C are graphs showing various aberrations of the zoom optical system according to Example 4 upon focusing on infinity, respectively in the wide angle end state, the intermediate focal length state, and the telephoto end state. FIGS. 12A, 12B, and 12C are graphs showing various aberrations of the zoom optical system according to Example 4 upon focusing on a short distant object, respectively in the wide angle end state, the intermediate focal length state, and the telephoto end state. It can be seen in these aberration graphs that the zoom optical system according to this Example can achieve excellent imaging performance with various aberrations successfully corrected from the wide angle end state to the telephoto end state, and can achieve excellent imaging performance upon focusing on a short distant object.

Furthermore, according to Examples described above, the focus lens group is small and light weight so that quick and quiet AF can be implemented without using a large barrel. Furthermore, a zoom optical system successfully preventing variation of aberrations upon zooming from the wide angle end state to the telephoto end state, as well as variation of aberrations upon focusing on a short distant object from an infinite distant object can be implemented.

Examples described above are merely examples of the invention according to the present application. The invention according to the present application is not limited to these examples.

The following configurations can be appropriately employed as long as the optical performance of the zoom optical system according to the present embodiment is not compromised.

Examples of values of the zoom optical system according to the present embodiment having three or five lens groups are described above. However, this should not be construed in a limiting sense, and a zoom optical system with other lens group configurations (for example, a configuration with four or six lens groups or the like) may be employed. More specifically, the zoom optical system according to the present embodiment may be further provided with a lens or a lens group closest to an object or further provided with a lens or a lens group closest to the image surface. The lens group is a portion including at least one lens separated from another lens with a distance varying upon zooming.

The focusing group is a portion including at least one lens separated from another lens with a distance varying upon focusing. Specifically, the focusing group may be provided for focusing from an infinite distant object to a short distant object, with a single or a plurality of lens groups or a partial lens group moved in the optical axis direction. The focusing group can be applied to auto focus, and is suitable for motor driving for auto focus (using supersonic wave motors, etc.).

The lens surface may be formed to have a spherical surface or a planer surface, or may be formed to have an aspherical shape. The lens surface having a spherical surface or a planer surface features easy lens processing and assembly adjustment, which leads to the processing and assembly adjustment less likely to involve an error compromising the optical performance, and thus is preferable. Furthermore, there is an advantage that a rendering performance is not largely compromised even when the image surface is displaced.

The lens surface having an aspherical shape may be achieved with any one of an aspherical shape formed by grinding, a glass-molded aspherical shape obtained by molding a glass piece into an aspherical shape, and a composite type aspherical surface obtained by providing an aspherical shape resin piece on a glass surface. A lens surface may be a diffractive surface. The lens may be a gradient index lens (GRIN lens) or a plastic lens.

The aperture stop is preferably disposed in the neighborhood of or within the third lens group. Alternatively, a lens frame may serve as the aperture stop so that the member serving as the aperture stop needs not to be provided.

The lens surfaces may be provided with an antireflection film featuring high transmittance over a wide range of wavelengths to achieve an excellent optical performance with reduced flare and ghosting and increased contrast. Thus, an excellent optical performance with reduced flare and ghosting and increased contrast can be achieved.

EXPLANATION OF NUMERALS AND CHARACTERS

| G1 first lens group | G2 second lens group |
|---|---|
| G3 third lens group | G4 fourth lens group |
| G5 fifth lens group | GR subsequent group |
| I image surface | S aperture stop |

The invention claimed is:

1. A zoom optical system comprising, in order from an object: a first lens group having positive refractive power; a second lens group having negative refractive power; and a subsequent group including at least one lens group, wherein
upon zooming, the second lens group is moved along an optical axis, and distances between the first lens group and the second lens group and between the second lens group and the subsequent group change,
the subsequent group comprises a focusing group having negative refractive power for focusing,
the first lens group comprises a 1-1st lens that has positive refractive power and is disposed closest to the object, and
following conditional expressions are satisfied:
0.20<f1/fR<0.85
4.30<f1/(−f2)<5.00
where,
f1 denotes a focal length of the first lens group,
fR denotes a focal length of a lens component, in the subsequent group, closest to an image surface, and
f2 denotes a focal length of the second lens group.

2. The zoom optical system according to claim 1, wherein the first lens group moves toward the object upon zooming from a wide angle end state to a telephoto end state.

3. The zoom optical system according to claim 1, wherein the focusing group comprises at least one lens having positive refractive power and at least one lens having negative refractive power.

4. The zoom optical system according to claim 3, wherein a following conditional expression is satisfied:
1.00<nFP/nFN <1.20
where,
nFP denotes a refractive index of a lens with largest positive refractive power in the focusing group, and
nFN denotes a refractive index of a lens with largest negative refractive power in the focusing group.

5. The zoom optical system according to claim 3, wherein a following conditional expression is satisfied:
0.52<vFP/vFN <0.82
where,
vFP denotes an Abbe number of the lens with the largest positive refractive power in the focusing group, and
vFN denotes an Abbe number of the lens with the largest negative refractive power in the focusing group.

6. The zoom optical system according to claim 1, wherein the first lens group includes, in order from the object: the 1-1st lens; a 1-2nd lens having negative refractive power; and a 1-3rd lens having positive refractive power.

7. The zoom optical system according to claim 1, wherein the second lens group includes, in order from the object: a 2-1st lens having negative refractive power; a 2-2nd lens having positive refractive power; and a 2-3rd lens having negative refractive power.

8. An optical apparatus comprising the zoom optical system according to claim 1.

9. A zoom optical system comprising, in order from an object: a first lens group having positive refractive power; a second lens group having negative refractive power; and a subsequent group including at least one lens group, wherein
upon zooming, the second lens group is moved along an optical axis, and distances between the first lens group and the second lens group and between the second lens group and the subsequent group change,
the first lens group includes, in order from the object: a 1-1st lens having positive refractive power; a 1-2nd lens having negative refractive power; and a 1-3rd lens having positive refractive power,
the subsequent group comprises a focusing group having negative refractive power for focusing, and
a following conditional expression is satisfied:
0.20<f1/fR<0.75
where,
f1 denotes a focal length of the first lens group, and
fR denotes a focal length of a lens component, in the subsequent group, closest to an image surface.

10. The zoom optical system according to claim 9, wherein the first lens group moves toward the object upon zooming from a wide angle end state to a telephoto end state.

11. The zoom optical system according to claim 9, wherein the focusing group comprises at least one lens having positive refractive power and at least one lens having negative refractive power.

12. The zoom optical system according to claim 9, wherein the second lens group includes, in order from the object: a 2-1st lens having negative refractive power; a 2-2nd lens having positive refractive power; and a 2-3rd lens having negative refractive power.

13. The zoom optical system according to claim 9, wherein a lens group disposed closest to an image side moves upon zooming.

14. The zoom optical system according to claim 9, wherein a lens disposed closest to an image side has positive refractive power.

15. A method for manufacturing a zoom optical system which comprises, in order from an object: a first lens group having positive refractive power;
a second lens group having negative refractive power; and a subsequent group including at least one lens group,
the method comprising a step of arranging the lens groups in a lens barrel so that:
upon zooming, the second lens group is moved along an optical axis, and distances between the first lens group and the second lens group and between the second lens group and the subsequent group change,
the subsequent group comprises a focusing group having negative refractive power for focusing, and
further comprising one of the following features (A) (B), or (C):
(A) the first lens group comprises a 1-1st lens that has positive refractive power and is disposed closest to the object, and
following conditional expressions are satisfied:
0.20<f1/fR<0.85
4.30<f1/(−f2)<5.00
where,
f1 denotes a focal length of the first lens group,
fR denotes a focal length of a lens component, in the subsequent group, closest to an image surface, and
f2 denotes a focal length of the second lens group;
(B) the first lens group includes, in order from the object: a 1-1st lens having positive refractive power; a 1-2nd lens having negative refractive power; and a 1-3rd lens having positive refractive power, and
a following conditional expression is satisfied:
0.20<f1/fR<0.75
where,
f1 denotes a focal length of the first lens group, and
fR denotes a focal length of a lens component, in the subsequent group, closest to an image surface; and
(C) a lens placed closest to an object in the subsequent lens group has positive refractive power, and a following conditional expression is satisfied:

$$0.30 < f1/fR \leq 0.44$$

where, f1 denotes a focal length of the first lens group, and fR denotes a focal length of a lens component, in the subsequent group, closest to an image surface.

16. A zoom optical system comprising, in order from an object: a first lens group having positive refractive power; a second lens group having negative refractive power; and a subsequent group including at least one lens group, wherein upon zooming, the second lens group is moved along an optical axis, and distances between the first lens group and the second lens group and between the second lens group and the subsequent group change, a lens placed closest to an object in the subsequent lens group has positive refractive power, the subsequent group comprises a focusing group having negative refractive power for focusing, and a following conditional expression is satisfied:

$$0.30 < f1/fR \leq 0.44$$

where, f1 denotes a focal length of the first lens group, and fR denotes a focal length of a lens component, in the subsequent group, closest to an image surface.

* * * * *